United States Patent
Nakajima et al.

(10) Patent No.: US 11,978,881 B2
(45) Date of Patent: May 7, 2024

(54) SET OF LIQUID COMPOSITIONS AND METHOD FOR MANUFACTURING ELECTROCHEMICAL ELEMENT

(71) Applicant: RICOH COMPANY, LTD., Tokyo (JP)

(72) Inventors: Satoshi Nakajima, Tokyo (JP); Hiromichi Kuriyama, Kanagawa (JP); Tomomasa Kajita, Kanagawa (JP); Toshiya Sagisaka, Kanagawa (JP); Masayoshi Nomura, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 259 days.

(21) Appl. No.: 16/953,660

(22) Filed: Nov. 20, 2020

(65) Prior Publication Data
US 2021/0159480 A1 May 27, 2021

(30) Foreign Application Priority Data
Nov. 26, 2019 (JP) .................................. 2019-213647
Sep. 25, 2020 (JP) .................................. 2020-161032

(51) Int. Cl.
*H01M 4/04* (2006.01)
*H01M 4/36* (2006.01)

(52) U.S. Cl.
CPC ......... *H01M 4/0416* (2013.01); *H01M 4/364* (2013.01)

(58) Field of Classification Search
None
See application file for complete search history.

(56) References Cited

U.S. PATENT DOCUMENTS

| 7,807,072 B2 | 10/2010 | Choi et al. |
| 10,090,554 B2 | 10/2018 | Yanagita et al. |
| 2010/0099026 A1 | 4/2010 | Choi et al. |
| 2016/0260972 A1 | 9/2016 | Hibino et al. |
| 2020/0220160 A1 | 7/2020 | Nakajima et al. |
| 2020/0235375 A1 | 7/2020 | Nakajima et al. |
| 2020/0295355 A1 | 9/2020 | Kanno et al. |

FOREIGN PATENT DOCUMENTS

| JP | 4402346 | 1/2010 |
| JP | 5571304 | 8/2014 |
| JP | 5913780 | 4/2016 |
| JP | 2020-113532 | 7/2020 |

*Primary Examiner* — Tracy M Dove
(74) *Attorney, Agent, or Firm* — .Grüneberg and Myers PLLC

(57) ABSTRACT

A set of liquid compositions used to form a positive or negative electrode layer is provided. The set of liquid compositions includes a first liquid composition having a first electrode material dissolving or dispersing in a first liquid; and a second liquid composition having a second electrode material dissolving or dispersing in a second liquid, the second electrode material differing from the first electrode material, and the second liquid differing from the first liquid, wherein the second electrode material dissolves or disperses easily in the second liquid than in the first liquid.

23 Claims, 7 Drawing Sheets

SET OF LIQUID COMPOSITIONS AND METHOD FOR MANUFACTURING ELECTROCHEMICAL ELEMENT

CROSS-REFERENCE TO RELATED APPLICATION

The present application is based on and claims priority under 35 U.S.C. § 119 to Japanese Patent Application No. 2019-213647, filed on Nov. 26, 2019, and Japanese Patent Application No. 2020-161032, filed on Sep. 25, 2020, the contents of which are incorporated herein by reference in their entirety.

BACKGROUND OF THE INVENTION

1. Field of the Invention

The disclosure relates to a set of liquid compositions and a method for manufacturing an electrochemical element.

2. Description of the Related Art

Electrochemical elements such as lithium ion secondary batteries, electric double layer capacitors, lithium ion capacitors, and redox capacitors are installed in mobile devices, hybrid vehicles, electric vehicles, and the like, and demands for electrochemical elements are expanding. In addition, there are growing needs for various types of wearable devices and thin batteries for medical patches, and demands for electrochemical elements are diversifying.

As a related art method for manufacturing an electrode, an electrode material and a liquid composition for an electrode mixture layer containing a liquid are applied by a die coater, a comma coater, a reverse roll coater, or the like to form the electrode mixture layer on the electrode substrate.

For example, the electrode mixture layer can be formed by screen printing the liquid composition for an electrode mixture layer on the electrode substrate.

However, in order to perform screen printing tailored for the needs, a screen needs to be fabricated on a per need basis.

Accordingly, a method for forming an electrode mixture layer that uses a liquid discharge device to discharge a liquid composition for the electrode mixture layer on an electrode substrate has been studied (see, for example, Patent Documents 1 and 2).

For example, from the viewpoint of drying efficiency of a liquid composition for an electrode mixture layer, a liquid having a low boiling point may be used as a liquid contained in the liquid composition for an electrode mixture layer.

However, electrode materials (e.g., active materials, conductive assistants, binders, electrolytes, etc.) with excellent properties of electrochemical elements may not always have excellent solubility or dispersibility in liquids with low boiling points.

In addition, from the viewpoint of the discharge properties of the liquid composition for an electrode mixture layer, a liquid having a high boiling point may be used as a liquid to be contained in the liquid composition for an electrode mixture layer.

Accordingly, to design a liquid composition for an electrode mixture layer that exhibits excellent electrochemical element properties and excellent discharge properties, various conditions need to be considered such as the solubility and dispersibility of the electrode material in the liquid, as well as electrochemical properties of the liquid and electrochemical properties of the electrode material. Therefore, it is desirable to improve the design flexibility of the liquid composition for an electrode mixture layer.

RELATED ART DOCUMENTS

Patent Documents

[Patent Document 1] Japanese Patent No. 5571304
[Patent Document 2] Japanese Patent No. 5913780

SUMMARY OF THE INVENTION

It is an object to provide a set of liquid compositions having a high design flexibility and capable of being used to form a positive or negative electrode mixture layer constituting an electrochemical element.

According to one aspect of the present invention, a set of liquid compositions used to form a positive or negative electrode layer is provided. The set of liquid compositions includes
- a first liquid composition having a first electrode material dissolving or dispersing in a first liquid; and
- a second liquid composition having a second electrode material dissolving or dispersing in a second liquid, the second electrode material differing from the first electrode material, and the second liquid differing from the first liquid, wherein
- the second electrode material dissolves or disperses easily in the second liquid than in the first liquid.

DETAILED DESCRIPTION OF THE PREFERRED EMBODIMENTS

Figures 1, 2:
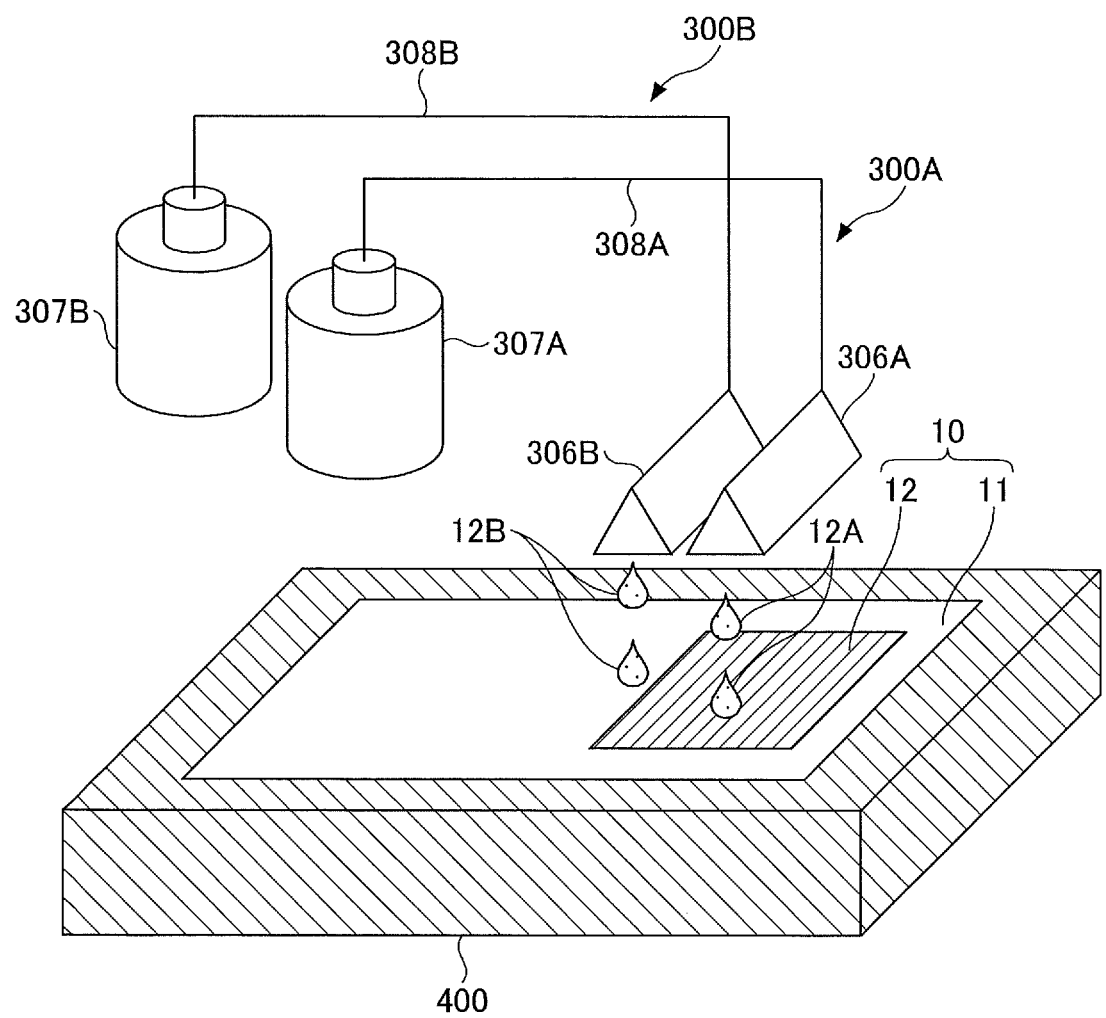
FIG. 1 is a cross-sectional view illustrating an example of a negative electrode according to a present embodiment.
FIG. 2 is a schematic view illustrating an example of a method for manufacturing a negative electrode according to the present embodiment.

Hereinafter, an embodiment of the present disclosure will be described with reference to the accompanying drawings. In some cases, the same components of a configuration are provided with the same reference numerals, and duplicated descriptions are thus omitted.

<Set of Liquid Compositions>

According to the present embodiment, a set of liquid compositions is used to form a positive or negative electrode mixture layer.

The set of liquid compositions according to the present embodiment includes a first liquid composition and a second liquid composition, where the first liquid composition has a first electrode material dissolving or dispersing in a first liquid, and the second liquid composition has a second electrode material dissolving or dispersing in a second liquid that differs from the first liquid.

As used herein and in the claims, a liquid indicates a liquid that functions as a medium in which an electrode material dissolves or disperses. Such a liquid does not include a liquid that functions as a precursor of a binder such as monomers.

Note that the first electrode material may include at least one substance selected from a group consisting of an active material, a conductive assistant, a binder, and an electrolyte. The first electrode material may preferably include a conductive assistant, which improves properties of an electrochemical element.

The second electrode material may also include at least one substance selected from a group consisting of an active material, a conductive assistant, a binder, and an electrolyte.

In the set of the liquid compositions according to the present embodiment, the second electrode material dissolves or disperses easily in the second liquid than in the first liquid.

As a result, the set of liquid compositions according to the present embodiment provides high design flexibility, excellent electrochemical element properties and excellent discharge properties.

The set of liquid compositions according to the present embodiment may include at least one selected from the group of the first liquid composition and the second liquid composition.

Note that "at least one selected from the group of the first liquid composition and the second liquid composition" may indicate only the first liquid composition, only the second liquid composition, or both the first liquid composition and the second liquid composition.

The set of liquid compositions including at least one type (one liquid composition) selected from the group of the first liquid composition and the second liquid composition may indicate one of the following cases:
- the set of liquid compositions includes one type (one liquid composition) selected from the first liquid compositions, and one type (one liquid composition) selected from the second liquid compositions;
- the set of liquid compositions includes two or more types (two or more liquid compositions) selected from the first liquid compositions, and one type (one liquid composition) selected from the second liquid compositions;
- the set of liquid compositions includes one type (one liquid compositions) selected from the first liquid compositions, and two or more types (two or more liquid compositions) selected from the second liquid compositions;
- the set of liquid compositions includes two or more types (two or more liquid compositions) selected from the first liquid composition, and two or more types (two or more liquid compositions) selected from the second liquid composition.

Generally, when one of the electrode active material, conductive assistant, binder, or electrolyte constituting an electrode mixture layer, conditions for dissolving or dispersing any one of the electrode active material, conductive assistant, binder, or electrolyte well in a liquid may differ from one to another. In addition, even when each of the electrode active material, the conductive assistant, the binder, and the electrolyte constituting the electrode mixture layer dissolves or disperses well in the same liquid, the mixture of two or more of these may not dissolve or disperse well.

When liquids exhibit different solubilities or dispersibilities with respect to electrode materials of different types among the electrode active material, the conductive assistant, the binder, and the electrolyte, which are expected to exhibit excellent electrochemical element properties, it may be difficult to discharge a liquid composition containing these electrode materials.

Thus, when at least one liquid composition from among the first liquid composition and the second liquid composition is of two or more types, design flexibility of the liquid composition is improved.

When at least one electrode material from among the first electrode material and the second electrode material includes an active material, the content of the active material in the liquid composition is preferably 20% by mass or more, and is further preferably 25% by mass or more. The content of the active material being 20% by mass or more in the liquid composition improves the capacity of the electrochemical element, and the content of the active material being 25% by mass or more further improves the capacity of the electrochemical element.

Note that the content of the active material in the liquid composition is preferably 60% by mass or less. The content of the active material in the liquid composition being 60% by mass or less improves the discharge performance of the liquid composition.

Preferably, each of the first liquid composition and the second liquid composition has a viscosity enabling discharge from the liquid discharge head.

Preferably, the viscosity of the liquid composition at 25° C. is 200 mPa·s or less. The viscosity of the liquid composition being 200 mPa·s or less at 25° C. improves discharge stability of the liquid composition.

In the present specification and the claims, the electrode material dissolving in a liquid indicates that the viscosity of the liquid composition at 25° C. is 200 mPa·s or less.

Also, the second electrode material being more soluble in the second liquid than in the first liquid indicates that when the second liquid is replaced with the first liquid in the second liquid composition, the viscosity increases at 25° C., or the second electrode material does not dissolve in the first liquid.

Preferably, the first electrode material and the second electrode material each have a maximum particle size smaller than a nozzle diameter of the liquid discharge head.

Herein, the maximum particle size indicates the particle size having the volume-based particle size distribution of 100%. The maximum particle size can be measured by a particle size distribution meter using laser diffraction.

The modal diameter of the first electrode material and the second electrode material is preferably 20 μm or less, more preferably 10 μm or less, and even more preferably 3 μm or less. The modal diameter of the first electrode material and the second electrode material being 20 μm or less improves the discharge stability and settling resistance of the first liquid composition and the second liquid composition. The modal diameter of the first electrode material and the second electrode material being 10 μm or less further improves the discharge stability and settling resistance of the first liquid composition and the second liquid composition. The modal diameter of the first electrode material and the second electrode material being 3 µm or less even further improves the discharge stability and settling resistance of the first liquid composition and the second liquid composition.

Herein, the modal diameter indicates the mode of the particle sizes in the particle size distribution. The modal diameter can be measured by a particle size distribution meter using laser diffraction.

In the specification and the claims, the electrode material being dispersed in a liquid indicates that the modal diameter of the liquid composition is 3 µm or less.

The second electrode material dispersing in the second liquid than in the first liquid indicates that when the second liquid is replaced with the first liquid in the second liquid composition, the modal diameter increases, or the second electrode material does not disperse in the first liquid.

The 10% diameter (d10) of the first electrode material and the second electrode material is preferably 0.10 µm or more, and more preferably 0.15 µm or more. The median diameter (d10) of the first electrode material and the second electrode material being 0.10 µm or more improves the storage stability of the liquid composition, and the median diameter (d10) being 0.15 µm or more further improves the storage stability of the liquid composition.

The 10% diameter of the electrode material can be measured by a particle size distribution meter using laser diffraction.

<Active Material>

As an active material, a positive electrode active material or a negative electrode active material may be used.

The positive electrode active material or the negative electrode active material may be used alone or in combination of two or more types.

Examples of the positive electrode active material include, but are not limited to, an alkali metal-containing transition metal compound insofar as the alkali metal-containing transition metal compound can occlude or release alkali metal ions.

Herein, the term "occlusion" indicates the insertion of alkali metal ions into the negative electrode active material. The term "release" indicates the loss of alkali metal ions from the negative electrode active material.

Examples of the alkali metal-containing transition metal compounds include lithium-containing transition metal compounds such as complex oxides containing lithium and one or more types of elements selected from a group consisting of cobalt, manganese, nickel, chromium, iron, and vanadium.

Examples of lithium-containing transition metal compounds include lithium cobaltate, lithium nickelate, lithium manganate, and the like.

As the alkali metal-containing transition metal compound, polyanionic compounds having an $XO_4$ tetrahedra (where X is P, S, As, Mo, W, Si, etc.) in the crystalline structure may also be used. Among these, lithium-containing transition metal phosphate compounds, such as lithium iron phosphate and lithium vanadium phosphate, are preferable from the viewpoint of cycle properties, and vanadium lithium phosphate is particularly preferable from the viewpoint of lithium diffusion coefficient and output properties. Preferably, the polyanionic-based compounds may be coated with a conductive assistant such as a carbon material and complexed in terms of electron conductivity.

Examples of the negative electrode active material include, but are not particularly limited to, a carbon material containing graphite having a crystal structure of graphite insofar as the carbon material is capable of occluding or releasing alkali metal ions.

Examples of the carbon material include natural graphite, artificial graphite, poorly graphitizable carbon (hard carbon), easily graphitizable carbon (soft carbon), and the like.

Examples of the negative electrode active material other than the carbon material include lithium titanate, titanium oxide, and the like.

Preferably, high-capacity materials such as silicon, tin, silicon alloy, tin alloy, silicon oxide, silicon nitride, and tin oxide may be used as the negative electrode active material, in terms of energy density of a non-aqueous storage device.

<Electrolyte>

As an electrolyte, a material for forming a solid electrolyte layer may be used. Examples of the material constituting the solid electrolyte layer include, but are not particularly limited to, any solid materials insofar as the solid materials have electronic insulation and ionic conductivity. However, a sulfide-based solid electrolyte or an oxide-based solid electrolyte are preferable in terms of having high ionic conductivity.

Examples of sulfide-based solid electrolyte include $Li_{10}GeP_2S_{12}$ or $Li_6PS_5X$ (where X is F, Cl, Br, or I) having a crystal structure of aldidite, and the like.

Examples of the oxide-based solid electrolyte include LLZ ($Li_7La_3Zr_2O_{12}$) having a garnet-type crystal structure or LATP ($Li_{1+x}Al_xTi2O_x (PO_4)_3$) having a NASICON-type crystal structure ($0.1 \le x \le 0.4$), LLT ($Li_{0.33}La_{0.55}TiO_3$) having a crystal structure of perovskite, and LIPON ($Li_{2.9}PO_{3.3}N_{0.4}$) having an amorphous-type crystal structure.

These solid electrolytes may be used alone or in combination of two or more types.

Examples of the electrolyte material dissolving or dispersing in the liquid to form these solid electrolyte layers include $Li_2S$, $P_2S_5$, and LidI, which are precursors of the solid electrolyte; and $Li_2S$—$P_2S_5$ glass, and $Li_7P_3S_{11}$ glass ceramics, which are materials of the solid electrolyte.

The material used to form a gel electrolyte layer may also be used as an electrolyte.

Examples of the gel electrolyte include, but are not particularly limited to, any materials such as polymers constituting a network structure of the gel electrolyte insofar as the gel electrolyte exhibits ionic conductivity. Examples of the polymers constituting a network structure of the gel electrolyte include polyethylene oxide, polypropylene oxide, polyacrylonitrile, polymethyl methacrylate, polyvinyl chloride, copolymers of vinylidene fluoride and propylene hexafluoride, polyethylene carbonate, and the like.

As solvent molecules retained in the gel electrolyte, ionic liquids may be given. Examples of ionic liquids include methyl-1-propylpyrrolidinium bis (fluorosulfonylimide), 1-butyl-1-methylpyrrolidinium bis (fluorosulfonylimide), 1-methyl-1-propylpiperidinium bis (fluorosulfonylimide), 1-ethyl-3-methylimidazolium bis (fluorosulfonylimide), 1-methyl-3-propylimidazolium bis (fluorosulfonylimide), N,N-diethyl-N-methyl N (2-methoxyethyl) ammonium bis (fluorosulfonyl)imide.

Alternatively, a liquid such as tetraglyme, propylene carbonate, fluoroethylene carbonate, ethylene carbonate, and diethyl carbonate may be mixed with lithium salts.

Examples of the lithium salts include, but are not particularly limited to, lithium hexafluorophosphate ($LiPF_6$), lithium tetrafluoroborate ($LiBF_4$), lithium hexafluoroarsenate ($LiAsF_6$), lithium trifluorometasulfonate ($LiCF_3SO_3$), lithium bis(trifluoromethylsulfonyl)imide ($LiN(CF_3SO_2)_2$), lithium bis(pentafluoroethylsulfonyl)imide (LiN(C$_2$F$_5$SO$_2$)$_2$), and the like, insofar as the lithium salts can be appropriately selected depending on the purpose.

These gel electrolytes may be used alone or in combination of two or more types.

To form these gel electrolyte layers, the electrolyte material dissolving or dispersing in a liquid may be a solution in which the above-described polymer compound, and the ionic liquid or lithium salt dissolve. Examples of the electrolyte material dissolving or dispersing in a liquid include a precursor material of the gel electrolyte (e.g., a combination of a solution having an ionic liquid or a lithium salt dissolving therein and a polyethylene oxide or polypropylene oxide having both ends as an acrylate group).

<Liquid>

Examples of a liquid include but are not particularly limited to any liquids insofar as the liquids have the positive or negative electrode material dispersed therein. Examples of liquids include water, ethylene glycol, propylene glycol, trimethylene glycol, N-methyl-2-pyrrolidone, 2-pyrrolidone, cyclohexanone, ethyl lactate, butyl acetate, mesitylene, ethylene glycol monoethyl ether, ethylene glycol monobutyl ether, ethylene glycol monoethyl ether acetate, diethylene glycol monoethyl ether, diethylene glycol monobutyl ether, propylene glycol monomethyl ether, propylene glycol monoethyl ether, propylene glycol monobutyl ether, 2-n-butoxymethanol, 2-dimethylethanol, N,N-dimethylacetamide, N,N-dimethylformamide, dimethyl sulfoxide, n-hexane, heptane, octane, nonane, decane, diethyl ether, dibutyl ether, di-tert-butyl ether, toluene, xylene, anisole, mesitylene, and the like.

The liquid may be used alone or in combination of two or more types.

<Conductive Assistant>

Examples of a conductive assistant include conductive carbon blacks formed by a furnace process, an acetylene process, a gasification process, or the like, and carbon materials such as carbon nanofibers, carbon nanotubes, graphene, or graphite particles.

As a conductive assistant, particles or fiber of metal, such as aluminum may be used other than a carbon material.

<Binder>

Examples of the binder include, but are not particularly limited to, any materials insofar as the materials can bond the negative electrode materials, the positive electrode materials, the negative electrode material and the negative electrode substrate, and the positive electrode material and the positive electrode substrate. However, materials that do not increase the viscosity of the liquid composition may be preferable from the viewpoint of reducing the nozzle clogging of the liquid discharge head.

As a material that does not increase the viscosity of the liquid composition, a polymer compound or the like which can dissolve or disperse in the liquid may be used.

When a polymer compound capable of dissolving in a liquid is used, a liquid composition obtained by dissolving the polymer compound in a liquid may have a viscosity enabling discharge from the liquid discharge head.

Examples of polymer compounds include polyamide compounds, polyimide compounds, polyamidoimides, ethylene-propylene-butadiene rubber (EPBR), styrene-butadiene rubber (SBR), nitrile butadiene rubber (HNBR), isoprene rubber, polyisobutene, polyethylene glycol (PEO), polymethylmethacrylic acid (PMMA), polyethylene vinyl acetate (PEVA), and the like.

Polymer particles may be used as the polymer compound capable of dissolving in a liquid.

The maximum particle size of the polymer particles may be less than the nozzle size of the liquid discharge head.

Preferably, the modal diameter of the polymer particles is from 0.01 to 1 μm.

Examples of the material constituting the polymer particles include thermoplastic resins such as polyvinylidene fluoride, acrylic resin, styrene-butadiene rubber, polyethylene, polypropylene, polyurethane, nylon, polytetrafluoroethylene, polyphenylene sulfide, polyethylene tephthalate, polybutylene tephthalate, and the like.

Further, the electrode material according to the present embodiment may include a precursor of the binder, a dispersant, or the like, as an electrode material other than those described above, to the extent that such an electrode material does not impair the effectiveness of the present embodiment.

<Precursor of Binder>

Example of the precursor of the binder include polymerizable compounds such as monomers.

When a polymerizable compound is used, for example, a binder is generated by polymerization after a liquid composition in which the polymerizable compound dissolves in a liquid is applied and heated or irradiated with non-ionizing radiation, ionizing radiation, infrared radiation, or the like.

As the polymerizable compound, a compound capable of polymerizing at 25° C. is preferable, although there is no particular limitation, provided that it has a polymerizable group.

The use of a polymerizable compound can generate multiple pores in the electrode mixture layer. In this case, the internal pores are preferably connected to other pores in the electrode mixture layer such that the connected pores extend in three dimensions. The connected pores allow the electrolyte to penetrate the electrode mixture layer sufficiently, thereby improving the ionic conductivity of the electrochemical element.

The polymerizable compound may be either monofunctional or polyfunctional.

Note that being monofunctional refers to having one polymerizable group, and being polyfunctional refers to having two or more polymerizable groups.

The polyfunctional polymerizable compound may be any polyfunctional polymerizable compound insofar as such a compound is polymerizable by heating or irradiation with non-ionizing radiation, ionizing radiation, infrared rays, or the like. Examples of the polyfunctional polymerizable compound include, but are not particularly limited to, acrylate, methacrylate, urethane acrylate resin, vinyl ester resin, unsaturated polyester, epoxy resin, oxetane resin, vinyl ether, and a resin utilizing an ene-thiol reaction. Among these, acrylate, methacrylate, urethane acrylate resin, and vinyl ester resin are preferable for productivity.

A polyfunctional acrylate acts as a Michael acceptor and causes a polyaddition reaction with a Michael donor.

Examples of the polyfunctional acrylate include, but are not limited to, low-molecular difunctional acrylates such as dipropylene glycol diacrylate and neopentyl glycol diacrylate; high-molecular difunctional acrylates such as polyethylene glycol diacrylate, urethane acrylate, and epoxy acrylate; trifunctional acrylates such as trimethylolpropane triacrylate and pentaerythritol triacrylate; and tetrafunctional or higher acrylates such as pentaerythritol tetraacrylate and dipentaerythritol hexaacrylate.

Examples of the Michael donor include, but are not limited to, polyfunctional amines and polyfunctional thiols.

Examples of the amines include, but are not limited to, ethylenediamine, 1,3-diaminopropane, 1,4-diaminobutane, 1,5-diaminopentane, 1,6-diaminohexane, 1,2-phenylenediamine, 1,3-phenylenediamine, and 1,4-phenylenediamine.

Examples of the thiols include, but are not limited to, 1,2-ethanedithiol, 1,3-propanedithiol, 1,4-butanedithiol, 2,3-butanedithiol, 1,5-pentanedithiol, 1,6-hexanedithiol, 1,2-benzenedithiol, 1,3-benzenedithiol, 1,4-benzenedithiol, 1,3,5-benzenetrithiol, and 4,4-biphenyldithiol.

As the catalyst for the polyaddition reaction, a catalyst usually used for the Michael addition reaction can be appropriately selected. Examples thereof include, but are not limited to, amine catalysts such as diazabicycloundecene (DBU) and N-methyldicyclohexylamine, base catalysts such as sodium methoxide, sodium ethoxide, potassium t-butoxide, sodium hydroxide, and tetramethylammonium hydroxide, metallic sodium, and butyllithium.

Examples of the polymerizable compound capable of addition-polymerizing (radial-polymerizing) include, but are not limited to, esters obtained by epoxidizing a double bond of a terpene having an unsaturated bond (such as myrcene, carene, ocimene, pinene, limonene, camphene, terpinolene, tricyclene, terpinene, fenchene, phellandrene, sylvestrene, sabinene, dipentene, bornene, isopulegol, and carvone) and adducting acrylic acid or methacrylic acid thereto; esters of a terpene-derived alcohol (such as citronellol, pinocampheol, geraniol, fenchyl alcohol, nerol, borneol, linalool, menthol, terpineol, twill alcohol, citronellal, ionone, irone, cinnerol, citral, pinol, cyclocitral, carvomenthone, ascaridole, safranal, piperitol, menthene monool, dihydrocarvone, carveol, sclareol, manol, hinokiol, ferruginol, totarol, sugiol, farnesol, patchouli alcohol, nerolidol, carotol, cadinol, lanceol, eudesmol, and phytol) with acrylic acid or methacrylic acid; citronellolic acid, hinokiic acid, santalic acid; and acrylates or methacrylates having a side chain having the backbone of menthane, carvotanacetone, phellandral, pimelitenone, perillaldehyde, thujone, calone, dageton, camphor, bisabolene, santalene, zingiberene, caryophyllene, curcumene, cedrene, cadinene, longifolene, sesquibenihene, cedrol, guaiol, kessoglycol, cyperone, eremophilone, zerumbone, camphorene, podocarprene, mylene, phyllocladene, totalene, ketomanoyl oxide, manoyl oxide, abietic acid, pimaric acid, neoabietic acid, levopimaric acid, iso-d-pimaric acid, agathene dicarboxylic acid, rubenic acid, carotenoid, peryl aldehyde, piperitone, ascaridole, pimene, fenchene, a sesquiterpene, a diterpene, or a triterpene. Examples of the polymerization initiator include, but are not limited to, photopolymerization initiators and thermal polymerization initiators.

Examples of the polymerization initiator include, but are not limited to, photopolymerization initiators and thermal polymerization initiators.

Examples of the photopolymerization initiators include photoradical generators.

Examples of the photoradical generators include, but are not limited to, α-hydroxyacetophenone, α-aminoacetophenone, 4-aroyl-1,3-dioxolane, benzyl ketal, 2,2-diethoxyacetophenone, p-dimethylaminoacetophene, p-dimethylaminopropiophenone, benzophenone, 2-chlorobenzophenone, 4,4'-dichlorobenzophenone, 4,4'-bis(diethylamino)benzophenone, Michler's ketone, benzyl, benzoin, benzyl dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, (1-hydroxycyclohexyl) phenyl ketone, 2-hydroxy-2-methyl-1-phenyl-1-one, 1-(4-isopropylphenyl)-2-hydroxy-2-methylpropane-1-one, methyl benzoylformate, benzoin alkyl ethers such as benzoin isopropyl ether, benzoin methyl ether, benzoin ethyl ether, benzoin isobutyl ether, benzoin n-butyl ether, and benzoin n-propyl ether, (1-hydroxycyclohexyl) phenyl ketone, 2-benzyl-2-dimethylamino-1-(4-morpholinophenyl)butanone-1, (1-hydroxycyclohexyl) phenyl ketone, 2,2-dimethoxy-1,2-diphenylethane-1-one, bis(η5-2,4-cyclopentadiene-1-yl)-bis[2,6-difluoro-3-(1H-pyrrole-1-yl)phenyl] titanium, bis(2,4,6-trimethylbenzoyl)phenylphosphine oxide, 2-methyl-1-[4-(methylthio)phenyl]-2-morpholinopropane-1-one, 2-hydroxy-2-methyl-1-phenylpropane-1-one (DAROCURE 1173), bis(2,6-dimethoxybenzoyl)-2,4,4-trimethylpentylphosphine oxide, 1-[4-(2-hydroxyethoxy)phenyl]-2-hydroxy-2-methyl-1-propane-1-one, monoacylphosphine oxide, disacylphosphine oxide, titanocene, fluorescein, anthraquinone, thioxanthone, xanthone, lophine dimer, trihalomethyl compounds, dihalomethyl compounds, active ester compounds, and organic boron compounds.

Photocrosslinked radical generators such as bisazide compounds such as 2,2'-azobis(2,4-dimethylvaleronitrile) may be used in combination with the photoradical generators.

Examples of the thermal polymerization initiators include, but are not limited to, azobisisobutyronitrile (AIBN).

As the polymerization initiator, a photoacid generator may also be used. In this case, when the applied liquid composition is irradiated with light, the photoacid generator generates an acid and the polymerizable compound is polymerized.

Examples of the polymerizable compound which is polymerizable in the presence of an acid include, but are not limited to, monomers having a cationically-polymerizable vinyl group, such as compounds having a cyclic ether group such as epoxy group, oxetane group, and oxolane group, acrylic compounds or vinyl compounds having the above-described substituent on a side chain, carbonate compounds, low-molecular-weight melamine compounds, vinyl ethers, vinylcarbazoles, styrene derivatives, α-methylstyrene derivatives, and vinyl alcohol esters such as ester compounds of vinyl alcohols with acrylic acid or methacrylic acid.

Examples of the photoacid generator include, but are not limited to, onium salts, diazonium salts, quinone diazide, organic halides, aromatic sulfonate, bisulfone compounds, sulfonyl compounds, sulfonate, sulfonium salts, sulfamide, iodonium salts, and sulfonyl diazomethane compounds. Of these, onium salts are preferable.

Examples of the onium salts include, but are not limited to, diazonium salts, phosphonium salts, and sulfonium salts, each containing fluoroborate ion, hexafluoroantimonate ion, hexafluoroarsenate ion, trifluoromethanesulfonate ion, or p-toluenesulfonate ion as a counter ion.

Examples of the photoacid generator further include halogenated triazine.

Each of these photoacid generators may be used alone or in combination with others. When the photoacid generator is used, a sensitizing dye may be used in combination.

Examples of the sensitizing dye include, but are not limited to, acridine, benzoflavin, perylene, anthracene, and laser dyes.

<Dispersant>

The liquid composition may further include a dispersant.

The dispersant is not particularly limited insofar as the dispersant is capable of improving dispersibility of the active material and the conductive auxiliary agent in the dispersion medium. Examples thereof include, but are not limited to, polymer dispersants such as polycarboxylic acid dispersants, naphthalenesulfonate formalin condensate dispersants, polyethylene glycol, polycarboxylic acid partial alkyl ester dispersants, polyether dispersants, and polyalkylene polyamine dispersants; low molecular weight dispersants such as alkyl sulfonic acid dispersants, quaternary ammonium salt dispersants, higher alcohol alkylene oxide dispersants, polyol ester dispersants, and alkylpolyamine dispersants; and inorganic dispersants such as polyphosphate dispersants.

[Method for Manufacturing Electrochemical Element]

The method for manufacturing an electrochemical element according to the present embodiment includes applying a set of liquid compositions of the present embodiment onto an electrode substrate to form an electrode mixture layer.

Here, examples of a method for applying a set of liquid compositions onto an electrode substrate include a method for sequentially applying a liquid composition constituting a set of liquid compositions onto an electrode substrate, a method for applying a liquid composition constituting a set of liquid compositions substantially simultaneously onto an electrode substrate, and the like.

Examples of the method for applying the liquid composition include, but are not limited to, spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and liquid discharge printing. Among these, liquid discharge printing is particularly preferable in view of the productivity of electrode.

When the liquid composition contains a polymerizable compound, the polymerizable compound is polymerized to form a binder by application of the liquid composition onto the electrode substrate followed by heating or irradiation with non-ionizing radiation, ionizing radiation, infrared radiation or the like.

The material constituting the electrode substrate (current collector) is not particularly limited insofar as the material has conductivity and is stable with respect to the applied potential.

<Negative Electrode>

FIG. 1 is a schematic view illustrating an example of a negative electrode according to the present embodiment.

A negative electrode 10 has a negative electrode mixture layer 12 formed on one surface of a negative electrode substrate 11.

The negative electrode mixture layer 12 may be formed on both surfaces of the negative electrode substrate 11.

The negative electrode 10 is not particularly limited in shape and may be in a flat-plate form.

Examples of the material constituting the negative electrode substrate 11 include, but are not limited to, stainless steel, nickel, aluminum, and copper.

<Method for Manufacturing Negative Electrode>

FIG. 2 is a schematic view illustrating an example of a method for manufacturing the negative electrode according to the present embodiment.

The method for manufacturing the negative electrode 10 includes a step of sequentially discharging a first liquid composition 12A and a second liquid composition 12B onto the negative electrode substrate 11 using liquid discharging devices 300A and 300B.

Here, each of the first and second liquid compositions includes a negative electrode material, and the negative electrode material includes a negative electrode active material, a conductive assistant, one of a binder or a precursor of a binder.

The liquid composition 12A is stored in a tank 307A. The liquid composition 12A is supplied from the tank 307A to a liquid discharge head 306A via a tube 308A. Similarly, the liquid composition 12B is stored in a tank 307B. The liquid composition 12B is supplied from the tank 307B to a liquid discharge head 306B via a tube 308B.

The number of liquid discharge devices is not limited to two, but may be three or more.

The liquid discharge device 300A (or 300B) may also be provided with a mechanism to cap the nozzles (a nozzle capping mechanism) to prevent the nozzles from drying when the liquid composition 12A (or 12B) is not discharged from the liquid discharge head 306A (or 306B).

In manufacturing the negative electrode 10, the negative electrode substrate 11 is placed on a heatable stage 400, and then droplets of the first liquid composition 12A and droplets of the second liquid composition 12B are sequentially discharged from the liquid discharge heads 306A and 306B onto the negative electrode substrate 11. In this step, the stage 400 may move, or the liquid discharge heads 306A, 306B may move.

When the liquid composition 12A discharged onto the negative electrode substrate 11 is heated, heating may be applied by the stage 400 or by a heating mechanism other than the stage 400.

The heating mechanism is not particularly limited insofar as the heating mechanism does not come into direct contact with the first liquid composition 12A and the second liquid composition 12B. Examples of the heating mechanism include, but are not limited to, a resistance heater, an infrared heater, and a fan heater.

Two or more heating mechanisms may be provided.

Alternatively, an ultraviolet curing device may be provided for polymerizing the polymerizable compound.

The heating temperature is not particularly limited insofar as the polymerizable compound is polymerized, and is preferably in the range of from 70 to 150° C. in view of energy used.

UV light may also be applied for heating the liquid composition 12A that is discharged onto the negative electrode substrate 11.

In the method for manufacturing a negative electrode according to the present embodiment, a negative electrode layer 12 is formed on the negative electrode substrate 11, thereby manufacturing the negative electrode 10.

Figure 3:
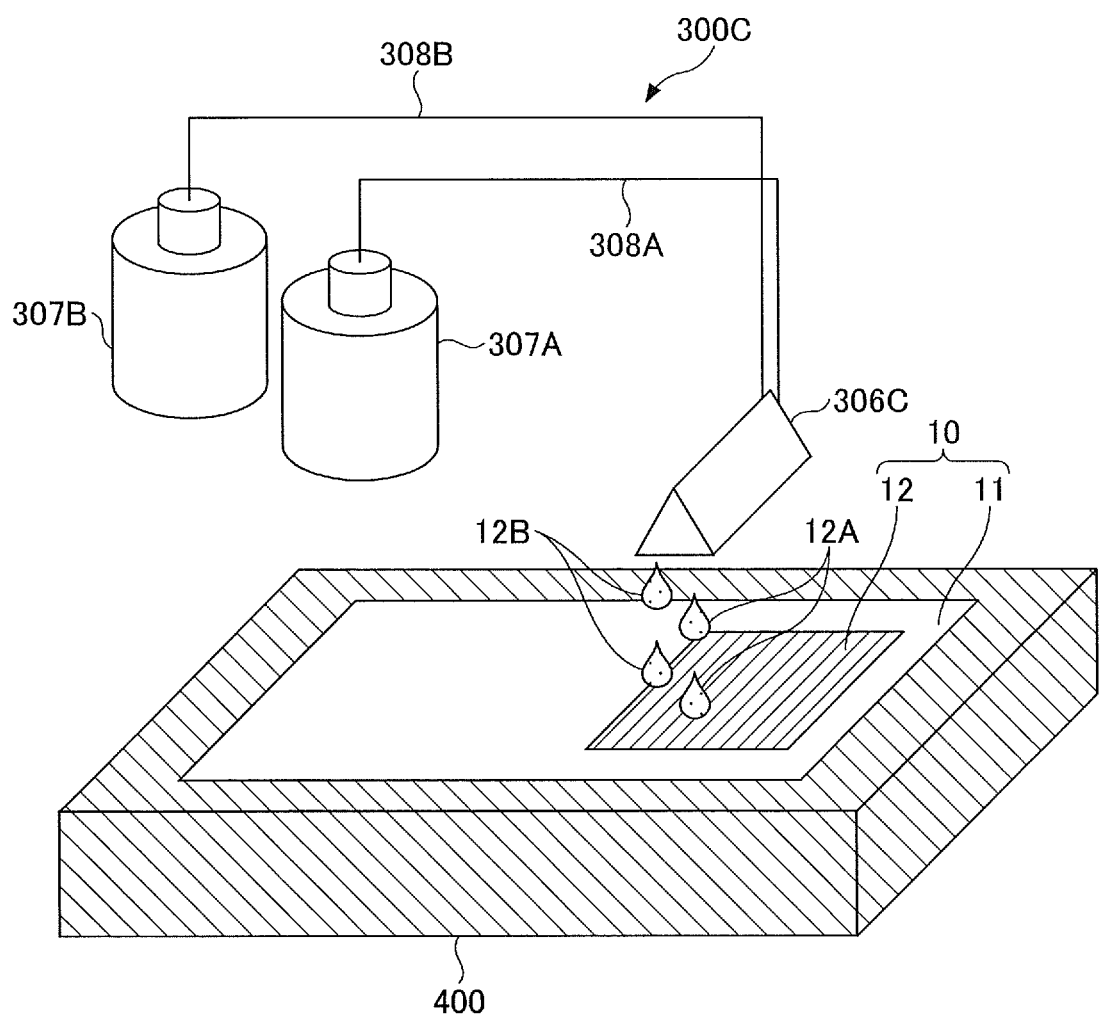
FIG. 3 is a schematic view illustrating another example of a method for manufacturing a negative electrode according to the present embodiment.

FIG. 3 is a schematic view illustrating another example of the method for manufacturing a negative electrode according to the present embodiment.

The method for manufacturing the negative electrode 10 includes a step of sequentially discharging the first liquid composition 12A and the second liquid composition 12B onto the negative electrode substrate 11 using a liquid discharging device 300C.

The liquid composition 12A is stored in the tank 307A. The liquid composition 12A is supplied from the tank 307A to a liquid discharge head 306C via the tube 308A. Similarly, the liquid composition 12B is stored in the tank 307B. The liquid composition 12B is supplied from the tank 307B via the tube 308B to the liquid discharge head 306C.

In manufacturing the negative electrode 10, the negative electrode substrate 11 is placed on the heatable stage 400, and then droplets of the first liquid composition 12A and droplets of the second liquid composition 12B are sequentially discharged from the liquid discharge head 306C onto the negative electrode substrate 11.

Figure 4:
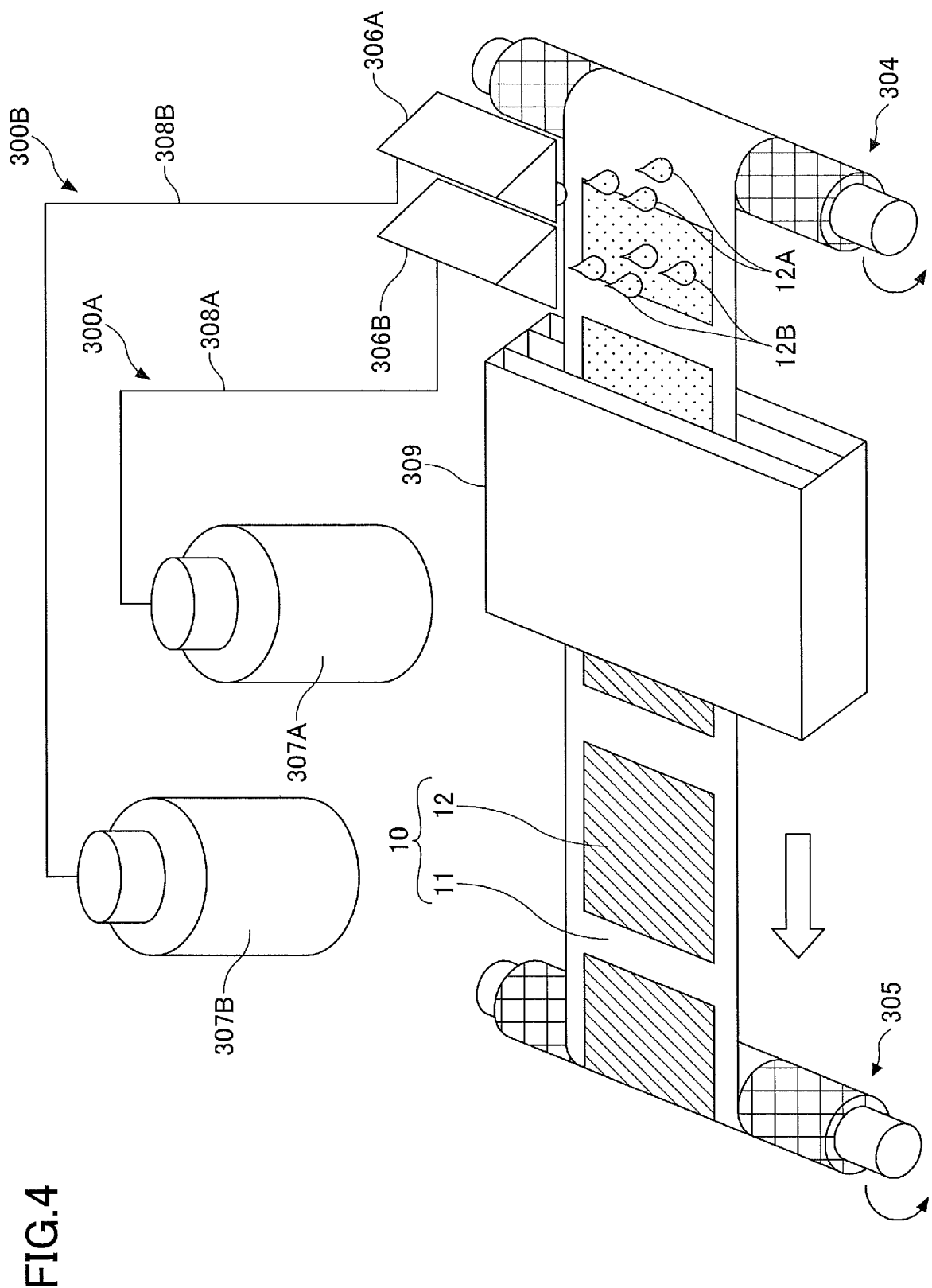
FIG. 4 is a schematic view illustrating another example of a method for manufacturing a negative electrode according to the present embodiment.

FIG. 4 a schematic view illustrating another example of the method for manufacturing a negative electrode according to the present embodiment.

The method for manufacturing the negative electrode 10 includes a step of sequentially discharging the first liquid composition 12A and the second liquid composition 12B onto the negative electrode substrate 11 using liquid discharging devices 300A and 300B.

First, the negative electrode substrate 11 having an elongated shape is prepared. The negative electrode substrate 11 is wound around a cylindrical core and set on a send-out roller 304 and a take-up roller 305 such that the side on which the negative electrode mixture layer 12 is to be formed faces upward, as illustrated in FIG. 4. Here, the send-out roller 304 and the take-up roller 305 rotate counterclockwise, and the negative electrode substrate 11 is conveyed in a direction from the right to the left in FIG. 4. The liquid discharge head 306A and 306B are disposed above the negative electrode substrate 11 between the send-out roller 304 and the take-up roller 305. The liquid discharge head 306A and 306B discharge droplets of the first liquid composition 12A and droplets of the second liquid composition 12B onto the sequentially conveyed negative electrode substrate 11 in the same manner as FIG. 2. The droplets of the first liquid composition 12A and the droplets of the second liquid composition 12B are discharged to cover at least a portion of the negative electrode substrate 11.

The liquid discharge heads 306A and 306B may be disposed in a direction substantially parallel to or substantially perpendicular to a conveyed direction of the negative electrode substrate 11.

Figure 5:
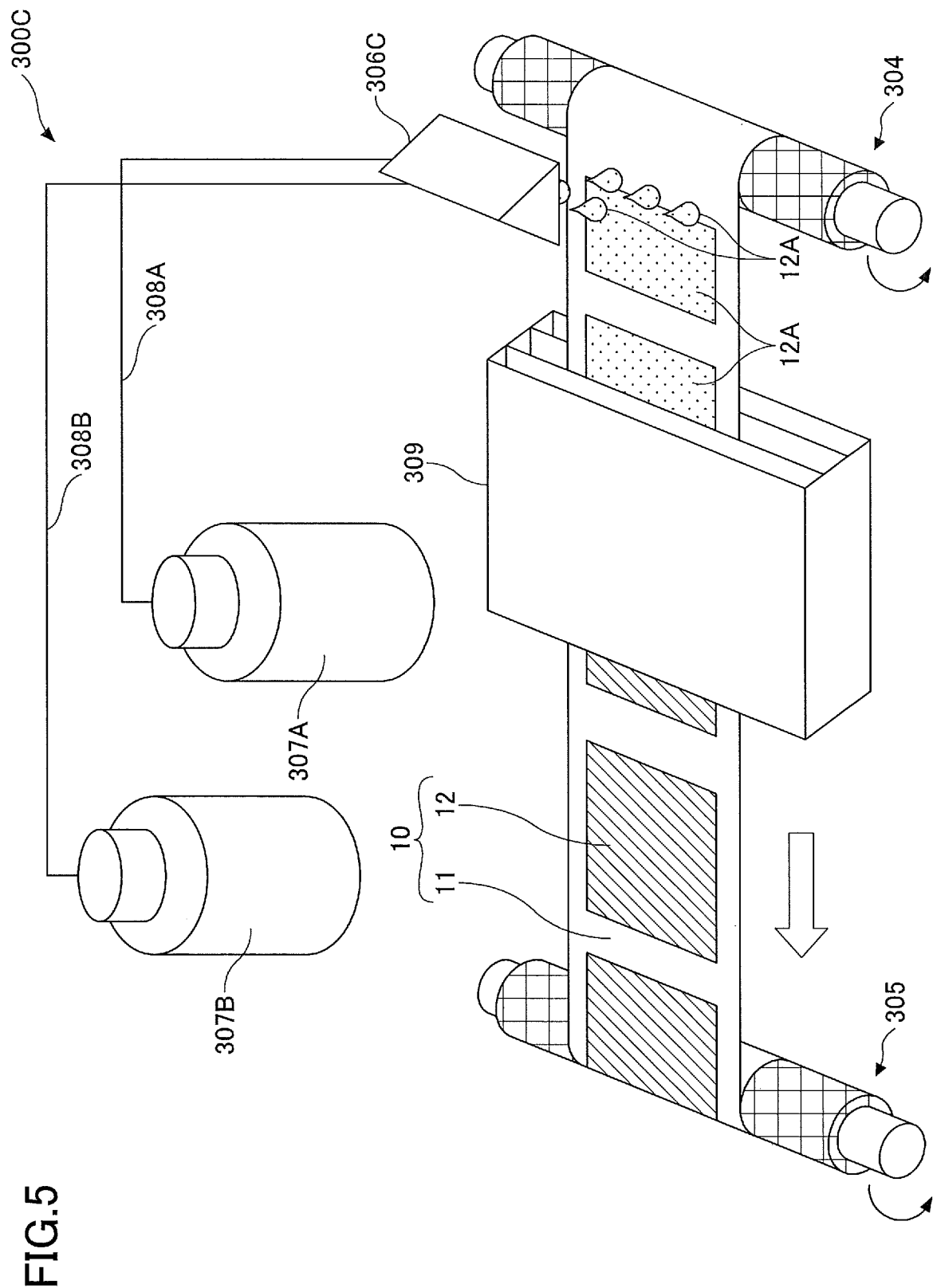
FIG. 5 is a schematic view illustrating another example of a method for manufacturing a negative electrode according to the present embodiment.

In the same manner as FIG. 3, the liquid discharge device 300C may be installed instead of the liquid discharge devices 300A and 300B (see FIG. 5).

Next, the negative electrode substrate 11, onto which the droplets of the first liquid composition 12A and the droplets of the second liquid composition 12B are discharged, is conveyed to a heating mechanism 309 by the send-out roller 304 and the take-up roller 305. As a result, the first liquid composition 12A and the second liquid composition 12B on the negative electrode substrate 11 are dried to form the negative electrode mixture layer 12, thereby manufacturing the negative electrode 10. The negative electrode 10 is then cut into a desired size by a punching process or the like.

The heating mechanism 309 is not particularly limited unless in direct contact with the first liquid composition 12A and the second liquid composition 12B. Examples of the heating mechanism 309 include, but are not limited to, a resistance heater, an infrared heater, and a fan heater.

The heating mechanism 309 may be disposed either above or below the negative electrode substrate 11, or two or more heating mechanisms 309 may be provided.

The heating temperature is not particularly limited insofar as the polymerizable compound is polymerized, and is preferably in the range of from 70 to 150° C. in view of energy used.

UV light may also be applied for heating the liquid composition 12A that is discharged to the negative electrode substrate 11.

Figure 6:
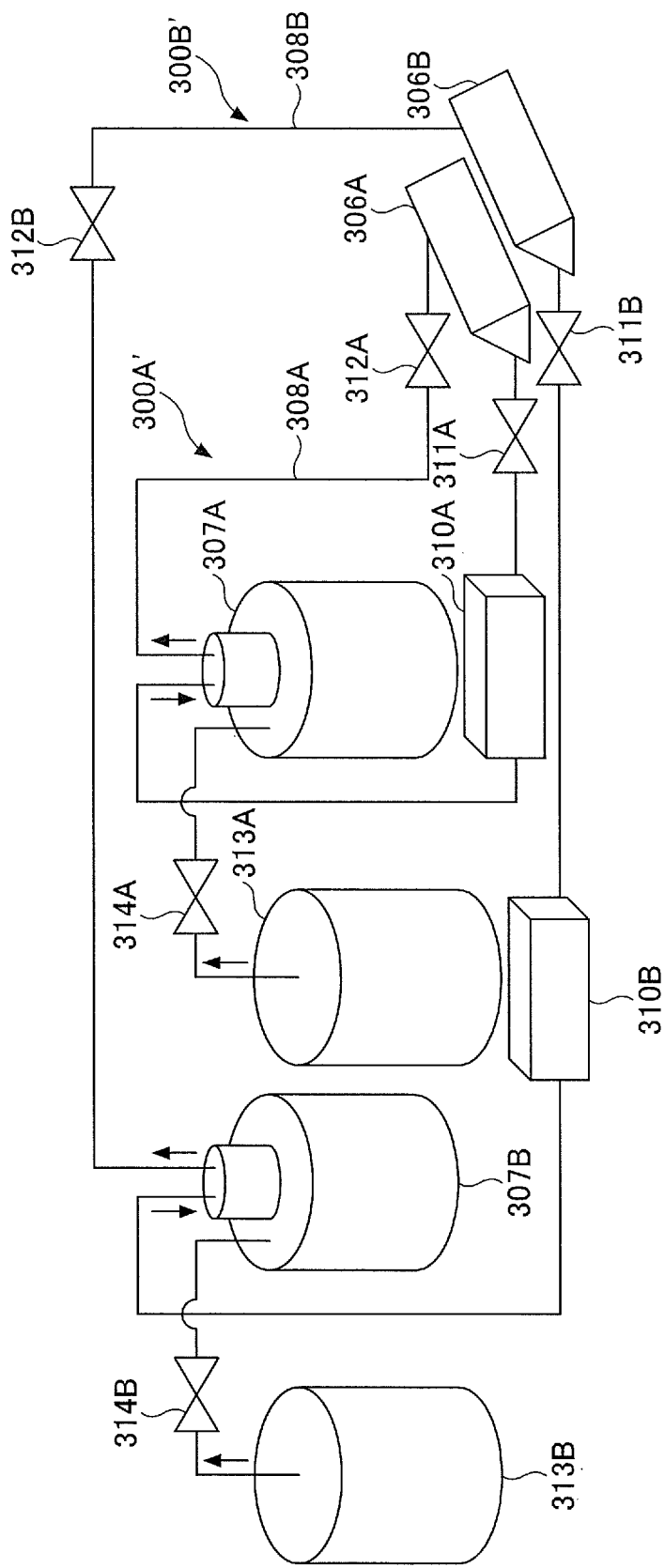
FIG. 6 is a schematic view illustrating a variation of a liquid discharge device used in FIGS. 2 to 5.

FIG. 6 is a schematic view illustrating a variation of the liquid discharge devices 300A and 300B.

A liquid discharge device 300A' is capable of circulating the first liquid composition 12A to the liquid discharge head 306A, the tank 307A, and the tube 308A by controlling a pump 310A and valves 311A and 312A. Similarly, a liquid discharge device 300B° is capable of circulating the first liquid composition 12B to the liquid discharge head 306B, the tank 307B, and the tube 308B by controlling a pump 310B and valves 311B and 312B.

The liquid discharge device 300A' is also provided with an external tank 313A. When the first liquid composition 12A in the tank 307A is reduced, the liquid discharge device 300A' is capable of supplying the first liquid composition 12A from the external tank 313A to the tank 307A by controlling the pump 310A and the valves 311A, 312A, and 314A. Similarly, the liquid discharge device 300B' is provided with an external tank 313B. When the second liquid composition 12B in the tank 307B is reduced, the liquid discharge device 300B' is capable of supplying the second liquid composition 12B from the external tank 313B to the tank 307B by controlling the pump 310B and valves 311B, 312B, and 314B.

The liquid discharge devices 300A' and 300B' are capable of discharging the liquid composition 12A and the liquid composition 12B to a targeted position on the negative electrode substrate 11. In addition, the liquid discharge devices 300A' and 300B' are capable of bonding the surfaces of the negative electrode substrate 11 and the negative electrode mixture layer 12 to be in contact with each other. Furthermore, the liquid discharge devices 300A° and 300B° are capable of making the thickness of the negative electrode mixture layer 12 uniform.

<Positive Electrode>

Figure 7:
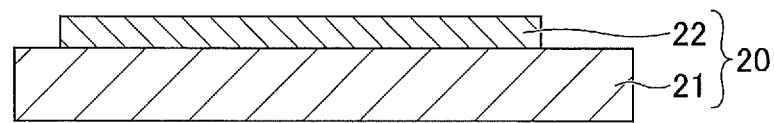
FIG. 7 is a cross-sectional view illustrating an example of a positive electrode according to the present embodiment.

FIG. 7 is a schematic view illustrating an example of a positive electrode according to the present embodiment.

A positive electrode 20 has a positive electrode mixture layer 22 formed on one surface of a positive electrode substrate 21.

The positive electrode mixture layer 22 may be formed on both surfaces of the positive electrode substrate 21.

The positive electrode 20 is not particularly limited in shape and may be in a flat-plate form.

Examples of the material constituting the positive electrode substrate 21 include, but are not limited to, stainless steel, aluminum, titanium, and tantalum.

<Method for Manufacturing Positive Electrode>

The method for manufacturing the positive electrode 20 is the same as the method for manufacturing the negative electrode 10 except that a liquid composition for manufacturing the positive electrode mixture layer 22 is discharged onto the positive electrode substrate 21.

Here, the liquid composition for manufacturing the positive electrode mixture layer 22 includes a positive electrode material, and the positive electrode material includes a positive electrode active material, a conductive assistant, and one of a binder or a precursor of a binder.

<Electrode Element>

Figure 8:
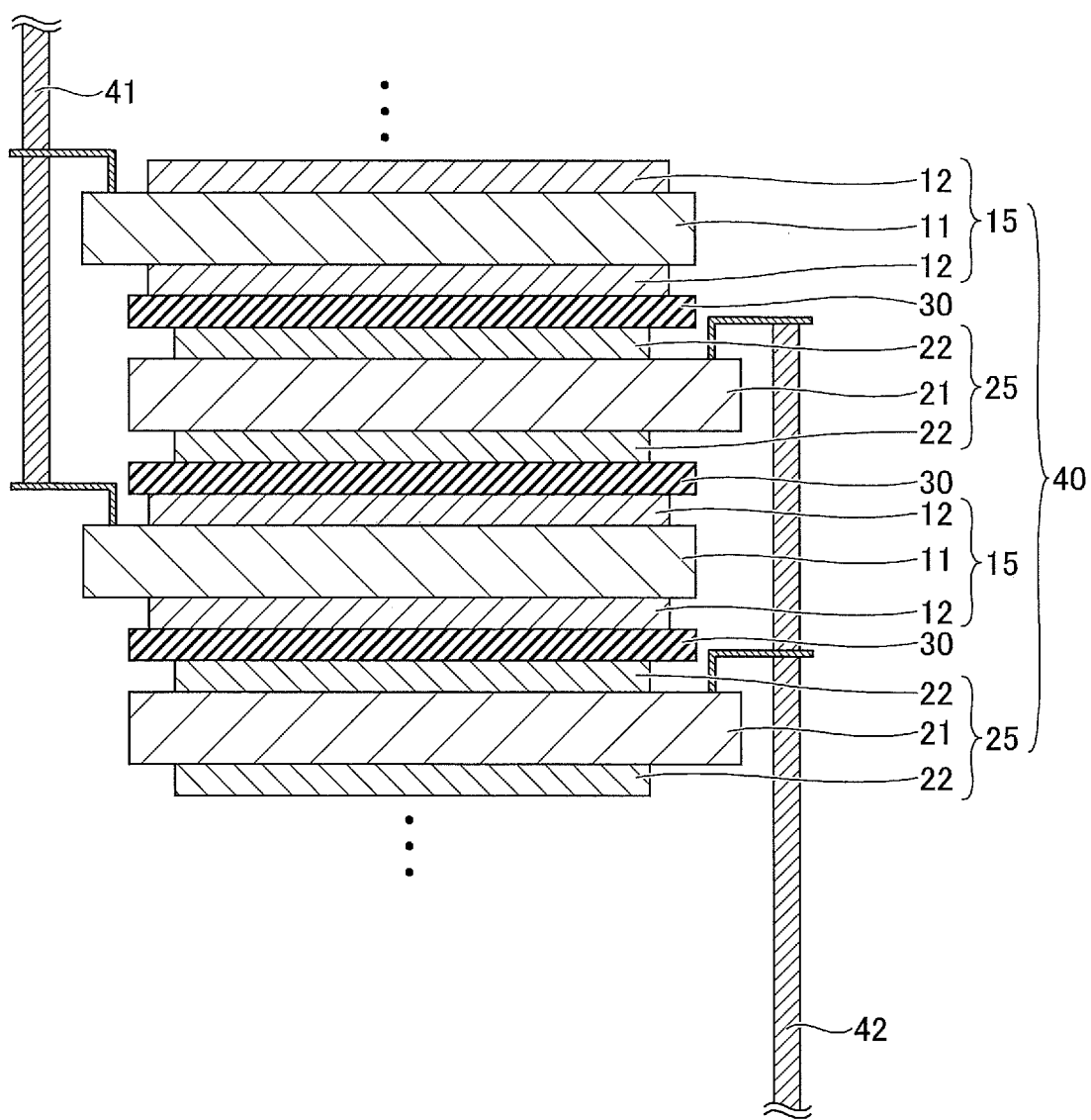
FIG. 8 is a cross-sectional view illustrating an example of an electrode element according to the present embodiment.

FIG. 8 is a schematic view illustrating an electrode element used for an electrochemical element of the present embodiment.

In an electrode element 40, a negative electrode 15 and a positive electrode 25 are laminated via a separator 30. The positive electrode 25 is laminated on both sides of the negative electrode 15. A lead wire 41 is connected to the negative electrode substrate 11, and a lead wire 42 is connected to the positive electrode substrate 21.

The negative electrode 15 is the same as the negative electrode 10 except that the negative electrode mixture layer 12 is formed on both surfaces of the negative electrode substrate 11.

The positive electrode 25 is the same as the positive electrode 20 except that the positive electrode mixture layer 22 is formed on both surfaces of the positive electrode substrate 21.

The number of laminations of the negative electrode 15 and the positive electrode 25 in the electrode element 40 is not particularly limited.

The number of the negative electrodes 15 and the number of the positive electrodes 25 in the electrode element 40 may be either the same or different.

<Separator>

A separator 30 is provided between the negative electrode 15 and the positive electrode 25 to prevent a short circuit between the negative electrode 15 and the positive electrode 25, as necessary.

Examples of the separator 30 include, but are not limited to, papers such as Kraft paper, vinylon mixed paper, and synthetic pulp mixed paper, cellophane, polyethylene grafted films, polyolefin nonwoven fabrics such as polypropylene melt-flow nonwoven fabric, polyamide nonwoven fabrics, glass fiber nonwoven fabrics, and micro-pore films.

The size of the separator 30 is not particularly limited insofar as the separator 30 can be used for the electrochemical element.

The separator 30 may have either a single-layer structure or a multi-layer structure.

In the case of using a solid electrolyte, the separator 30 can be omitted.

<Electrochemical Element>

Figure 9:
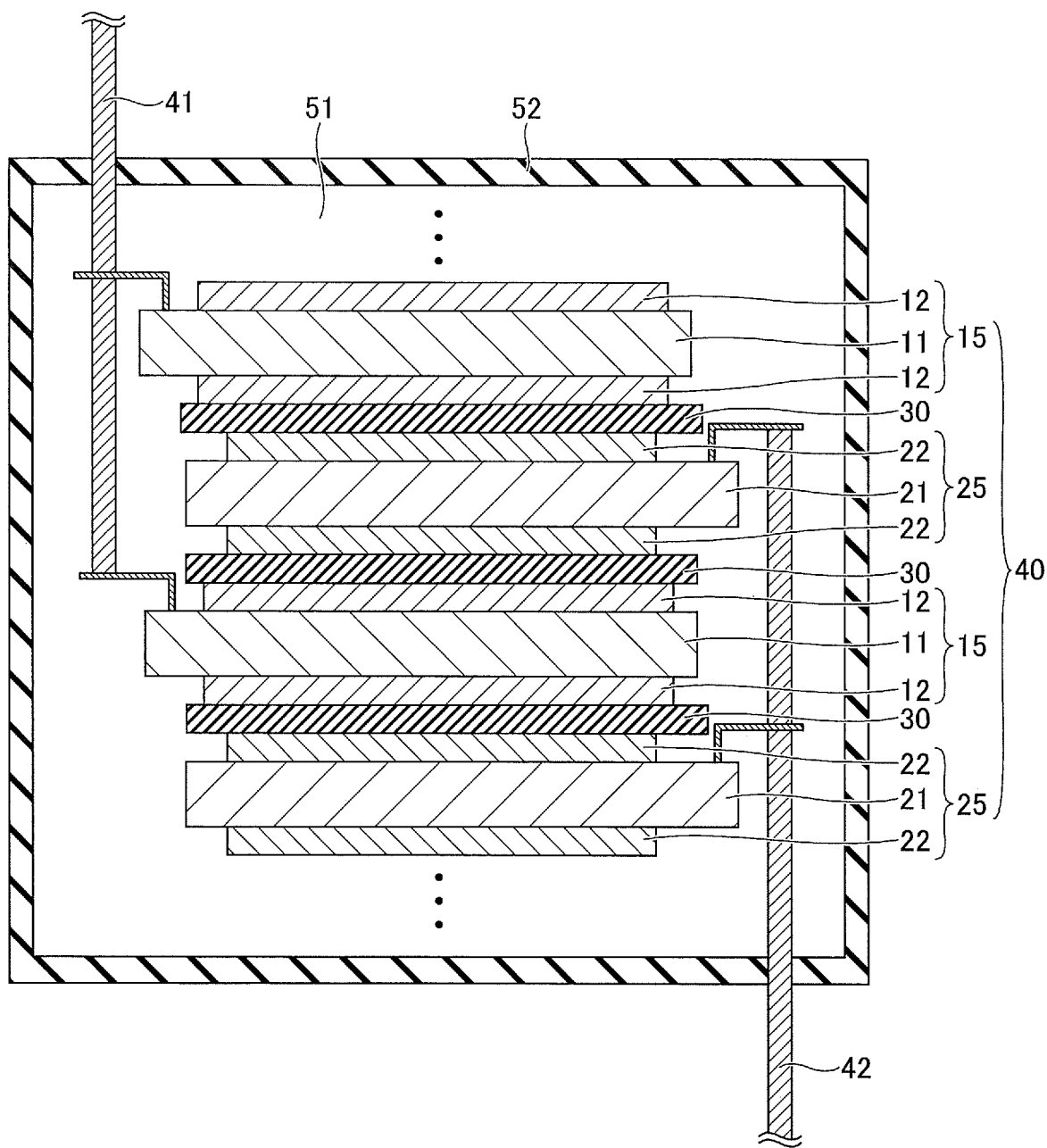
FIG. 9 is a cross-sectional view illustrating an example of an electrochemical element according to the present embodiment.

FIG. 9 is a schematic view illustrating an electrochemical element according to the present embodiment.

In an electrochemical element 1, an electrolyte layer 51 is formed by injecting an electrolyte aqueous solution or a non-aqueous electrolyte into the electrode element 40 and sealed with an outer packaging 52. In the electrochemical element 1, the lead wires 41 and 42 are drawn out of the outer packaging 52.

The electrochemical element 1 may further include other members, as necessary.

The electrochemical element 1 is not particularly limited, and examples of the electrochemical element 1 include aqueous power storage elements and non-aqueous power storage elements.

The shape of the electrochemical element 1 is not particularly limited and may be of a laminate type, a cylinder type in which a sheet electrode and a separator are assembled in a spiral manner, another cylinder type in which a pellet electrode and a separator are combined into an inside-out structure, or a coin type in which a pellet electrode and a separator are laminated.

<Electrolyte Aqueous Solution>

Examples of the electrolyte salt constituting the electrolyte aqueous solution include, but are not limited to, sodium hydroxide, potassium hydroxide, sodium chloride, potassium chloride, ammonium chloride, zinc chloride, zinc acetate, zinc bromide, zinc iodide, zinc tartrate, and zinc perchloride, <Non-Aqueous Electrolyte>

Examples the non-aqueous electrolyte include a solid electrolyte and a non-aqueous electrolyte.

The non-aqueous electrolyte refers to an electrolyte in which an electrolyte salt dissolves in a non-aqueous solvent.

<Non-Aqueous Solvent>

Preferable examples of non-aqueous solvents include, but are not particularly limited to, an aprotic organic solvent.

Examples of the aprotic organic solvent include carbonate-based organic solvents such as chain carbonates and cyclic carbonates. Of these, chain carbonates are preferable in terms of high solubility of electrolyte salts.

Preferably, the aprotic organic solvent has a low viscosity.

Examples of the chain carbonate include, but are not limited to, dimethyl carbonate (DMC), diethyl carbonate (DEC), and methyl ethyl carbonate (EMC).

The content (proportion) of the chain carbonate in the non-aqueous solvent is preferably 50% by mass or more. When the content of the chain carbonate in the non-aqueous solvent is 50% by mass or more, the content of the cyclic substance is low, despite the fact that the non-aqueous solvent other than the chain carbonate is a cyclic substance (e.g., cyclic carbonate, cyclic ester) having a high dielectric constant. Thus, even when the non-aqueous electrolyte has a high concentration of 2M or more, the viscosity of the non-aqueous electrolyte solution is low, which improves permeation of the non-aqueous electrolyte in the electrode and ion diffusion.

Examples of the cyclic carbonates include, but are not limited to, propylene carbonate (PC), ethylene carbonate (EC), butylene carbonate (BC), and vinylene carbonate (VC).

Examples of the non-aqueous solvents other than the carbonate-based organic solvents include, but are not limited to, ester-based organic solvents such as cyclic esters and chain esters, and ether-based organic solvents such as cyclic ethers and chain ethers.

Examples of the cyclic esters include γ-butyrolactone (γBL), 2-methyl-γ-butyrolactone, acetyl-γ-butyrolactone, and γ-valerolactone.

Examples of the chain esters include propionic acid alkyl esters, malonic acid dialkyl esters, acetic acid alkyl esters (e.g., methyl acetate (MA), ethyl acetate), and formic acid alkyl esters (e.g., methyl formate (MF), ethyl formate).

Examples of the cyclic ethers include tetrahydrofuran, alkyltetrahydrofuran, alkoxytetrahydrofuran, dialkoxytetrahydrofuran, 1,3-dioxolan, alkyl-1,3-dioxolan, and 1,4-dioxolan.

Examples of the chain ethers include 1,2-dimethoxyethane (DME), diethyl ethers, ethylene glycol dialkyl ethers, diethylene glycol dialkyl ethers, triethylene glycol dialkyl ethers, and tetraethylene glycol dialkyl ethers.

<Electrolyte Salt>

Electrolyte salts are not particularly limited insofar as the electrolyte salts have high ion conductivity and are soluble in a non-aqueous solvent.

Preferably, the electrolyte salts contain halogen atoms.

Examples of cations constituting the electrolyte salt include lithium ions.

Examples of anions constituting the electrolyte salt include $BF_4^-$, $PF_6^-$, $AsF_6^-$, $CF_3SO_3^-$, $(CF_3SO_2)_2N^-$, and $(C_2F_5SO_2)_2N^-$.

Lithium salts are not particularly limited and can be suitably selected according to the purpose of particular applications. Examples of the lithium salt include, but are not limited to, lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bis(trifluoromethylsulfonyl)imide ($LiN(CF_3SO_2)_2$), and lithium bis(pentafluoroethylsulfonyl)imide ($LiN(C_2F_5SO_2)_2$). Among these, $LiPF_5$ is preferable for ion conductivity, and $LiBF_4$ is preferable for stability.

Each of these electrolyte salts may be used alone or in combination of two or more types.

The concentration of the electrolyte salt in the non-aqueous electrolyte can be suitably selected according to a particular application. In the case of a swing-type non-aqueous power storage element, the concentration is preferably from 1 to 2 mol/L. In the case of a reserve-type non-aqueous power storage element, the concentration is preferably from 2 to 4 mol/L.

<Applications of Electrochemical Element>

Applications of the electrochemical element are not particularly limited. For example, the electrochemical element may be applied to laptop computers, pen input personal computers, mobile personal computers, electronic book players, cellular phones, portable facsimile machines, portable copiers, portable printers, headphone stereos, video movie recorders, liquid crystal display televisions, handheld cleaners, portable CD players, mini disk players, transceivers, electronic organizers, calculators, memory cards, portable tape recorders, radios, backup power sources, motors, illumination apparatuses, toys, game machines, clocks, electronic flashes, and cameras.

EXAMPLES

Hereinafter, examples of the present embodiment will be described, but the present embodiment is not limited to the examples. In the present embodiment, the application in the case where the electrode material is the positive electrode active material or the negative electrode active material will be described. However, the same may apply to the case in which the electrode material is the electrode material other than the positive electrode active material or the negative electrode active material.

[Particle Size Distribution of Liquid Composition]

The liquid composition was dispersed in water or an organic solvent used in each Example, and the particle size distribution of the active material was measured at 25° C. by a laser diffraction particle size analyzer MASTERSIZER 3000 (manufactured by Malvern Panalytical Ltd.).

[Viscosity of Liquid Composition]

The viscosity of the liquid composition was measured by a B-type viscometer (cone plate viscometer) equipped with a rotor No. CPA-40Z under a rotation speed of 100 rpm and a temperature of 25° C.

[Peel Strength of Electrode Composite Material]

The peel strength of the electrode composite material was measured by a peel analyzer VPA-3 (manufactured by KYOWA INTERFACE SCIENCE CO., LTD.) (a peel strength test method). Specifically, the prepared electrode was cut into a test piece having a width of 1.8 cm and a length of 10 cm, then a piece of cellophane tape was attached to one surface of the test piece facing the electrode composite material. The piece of cellophane tape was then peeled off 100 mm from one end of the test piece at a peeling speed of 30 mm/min and a peeling angle of 90 degrees, and the stress was measured at that time. This measurement operation was performed 10 times, and the weighted average of the stress was determined as a peel strength of the electrode composite material.

[Capacity of Positive Electrodes A to F, and A']

After the positive electrode was punched into a round shape having a diameter of 16 mm, a glass separator (manufactured by ADVANTEC) having a thickness of 100 μm, a non-aqueous electrolyte 1, and a lithium (manufactured by HONJO METAL CO., LTD.) having a thickness of 200 μm as the opposite electrode were placed in the coin can, and a non-aqueous power storage element was obtained.

First, at room temperature (25° C.), the non-aqueous power storage element was charged to an end-of-charge voltage of 4.2 V with a constant current of 0.1 mA/cm$^2$ and then discharged to 2.5 V with a constant current of 0.1 mA/cm$^2$, thereby performing an initial charge-discharge. Next, a charge-discharge cycle in which the non-aqueous power storage element was charged to 4.2 V with a constant current of 0.1 mA/cm$^2$ and then discharged to 3.0 V with a constant current of 0.1 mA/cm$^2$ was performed twice, and the capacity of the positive electrode per unit area was measured.

The capacity of the positive electrode per unit area was measured by a charge-discharge test system TOSCAT 3001 (available from TOYO SYSTEM CO., LTD.).

[Capacity of Negative Electrode A]

After the negative electrode was punched into a round shape with a diameter of 16 mm, a glass separator (manufactured by ADVANTEC) having a thickness of 100 μm, a non-aqueous electrolyte 1, and a lithium (manufactured by HONJO METAL CO., LTD.) having a thickness of 200 μm as the opposite electrode were placed in a coin can, and a non-aqueous power storage element was obtained.

First, at room temperature (25° C.), the non-aqueous power storage element was charged to an end-of-charge voltage of 1.0 V with a constant current of 0.1 mA/cm$^2$ and then discharged to 2.0 V with a constant current of 0.1 mA/cm$^2$, thereby performing an initial charge-discharge. Next, a charge-discharge cycle in which the non-aqueous power storage element was charged to 1.0 V with a constant current of 0.1 mA/cm$^2$ and thereafter discharged to 2.0 V with a constant current of 0.1 mA/cm$^2$ was performed twice, and the capacity of the negative electrode per unit area was measured.

[Capacity of Negative Electrode B]

After the negative electrode was punched into a round shape with a diameter of 16 mm, a glass separator (manufactured by ADVANTEC) having a thickness of 100 μm, a non-aqueous electrolyte 1, and a lithium (manufactured by HONJO METAL CO., LTD.) having a thickness of 200 μm as the opposite electrode were placed in a coin can, and a non-aqueous power storage element was obtained.

First, at room temperature (25° C.), the non-aqueous power storage element was charged to an end-of-charge voltage of 0.2 V with a constant current of 0.4 mA/cm$^2$ and then discharged to 2.0 V with a constant current of 0.4 mA/cm$^2$, thereby performing an initial charge-discharge. Next, a charge-discharge cycle in which the non-aqueous power storage element was charged to 0.2 V with a constant current of 0.1 mA/cm$^2$ and then discharged to 2.0 V with a constant current of 0.4 mA/cm$^2$ was performed twice, and the capacity of the negative electrode per unit area was measured.

[Positive Electrode Active Material 1]

Vanadium pentoxide, lithium hydroxide, phosphoric acid, sucrose, and water were mixed to form a precipitate. The precipitate was then pulverized to obtain a precursor of vanadium phosphate particles. Next, the precursor of vanadium phosphate was burnt at 900° C. under a nitrogen atmosphere to obtain lithium vanadium phosphate (LVP) having a carbon content of 3% by mass. The LVP had a modal diameter of 10 μm. The LVP was further crushed by a jet mill to obtain a positive electrode active material 1. The positive electrode active material 1 had a modal diameter of 0.7 μm and a capacity per unit area of 0.26 mAh/cm$^2$.

[Positive Electrode Active Material 2]

Nickel-based positive electrode active material (NCA) (manufactured by JFE MINERAL CO., LTD.) was crushed using a jet mill to obtain a positive electrode active material 2. The positive electrode active material 2 had a modal diameter of 1.5 μm and a capacity per unit area of 0.35 mAh/cm$^2$.

[Positive Electrode Active Material 3]

Lithium cobaltate (LCO) (manufactured by TOSHIMA MANUFACTURING CO., LTD.) was crushed using a bead mill to obtain a positive electrode active material 3. The positive electrode active material 3 had a modal diameter of 1.3 μm and a capacity per unit area of 0.23 mAh/cm$^2$.

[Positive Electrode Active Material 4]

Lithium manganate (LMO) (manufactured by TOSHIMA MANUFACTURING CO., LTD.) was crushed using a bead mill to obtain a positive electrode active material 4. The positive electrode active material 4 had a modal diameter of 1.3 μm and a capacity per unit area of 0.31 mAh/cm$^2$.

[Positive Electrode Active Material 5]

Lithium iron phosphate (LFP) (manufactured by TATUNGFINECHEMICALS) was crushed using a bead mill to obtain a positive electrode active material 5. The positive electrode active material 5 had a modal diameter of 1.0 μm and a capacity per unit area of 0.33 mAh/cm$^2$.

[Positive Electrode Active Material 6]

Nickel-based positive electrode active material (NCA) (JFE MINERAL CO., LTD.) was crushed using a bead mill to obtain a positive electrode active material 6. The positive electrode active material 6 had a modal diameter of 9.6 μm and a capacity per unit area of 0.35 mAh/cm$^2$.

[Negative Electrode Active Material 1]

Lithium titanate (LTO) (manufactured by Ishihara Sangyo Co.) was crushed using a bead mill to obtain a negative electrode active material 1. The negative electrode active material 1 had a modal diameter of 2.0 μm and a capacity per unit area of 0.31 mAh/cm$^2$.

[Negative Electrode Active Material 2]

Silicon monoxide (SiO) (manufactured by Osaka Titanium) was crushed using a bead mill to obtain a negative electrode active material 2. The negative electrode active material 2 had a modal diameter of 1.0 μm and a capacity per unit area of 2.0 mAh/cm$^2$.

Table 1 indicates the evaluation results of the modal diameter of active material (μm) and the capacity per unit area.

TABLE 1

| ACTIVE MATERIAL | MODAL DIAMETER (μm) | CAPACITY (mAh/cm$^2$) |
| --- | --- | --- |
| POSITIVE ELECTRODE ACTIVE MATERIAL 1 | 0.7 | 0.26 |
| POSITIVE ELECTRODE ACTIVE MATERIAL 2 | 1.5 | 0.35 |
| POSITIVE ELECTRODE ACTIVE MATERIAL 3 | 1.3 | 0.23 |
| POSITIVE ELECTRODE ACTIVE MATERIAL 4 | 1.3 | 0.31 |
| POSITIVE ELECTRODE ACTIVE MATERIAL 5 | 1.0 | 0.33 |
| POSITIVE ELECTRODE ACTIVE MATERIAL 6 | 9.6 | 0.35 |
| NEGATIVE ELECTRODE ACTIVE MATERIAL 1 | 2.0 | 0.31 |
| NEGATIVE ELECTRODE ACTIVE MATERIAL 2 | 1.0 | 2.0 |

[Non-Aqueous Electrolyte 1]

LiPF$_6$ dissolved in a mixed solvent of propylene carbonate (PC)/diethyl carbonate (DEC)/ethylmethyl carbonate (EMC) (in a mass ratio of 1:1:1) to prepare 1.0 mol/L of a non-aqueous electrolyte 1 (20 mL).

Example 1

The positive electrode active material 1 (30% by mass), carbon black (3% by mass) as a conductive assistant, and ethyl lactate (67% by mass) (FUJIFILM WAKO PURE CHEMICAL INDUSTRIES, LTD.) were mixed to prepare a liquid composition A as a first liquid composition. The liquid composition A had a viscosity of 10.3 mPa·s and a modal diameter of 1.58 μm.

Polyamideimide (3% by mass) as a binder, and N-methylpyrrolidone (NMP) (FUJIFILM WAKO PURE CHEMICAL INDUSTRIES, LTD.) (97% by mass) were mixed to prepare a liquid composition B as a second liquid composition. The liquid composition B in which polyamideimide dissolved in N-methylpyrrolidone (NMP) had a viscosity of 9.6 mPa·s.

When the liquid composition was formed by mixing the polyamideimide (3% by mass) and the ethyl lactate (FLTJIFILM WAKO PURE CHEMICAL INDUSTRIES, LTD.) (97%), the liquid composition became cloudy, and a precipitate was formed. That is, polyamideimide, a second electrode material, was more soluble in N-methylpyrrolidone, a second liquid, than ethyl lactate, a first liquid.

A positive electrode was obtained by causing a liquid discharge device EV2500 to discharge the liquid compositions A and B onto an aluminum foil, as illustrated in FIG. 2. At this time, the aluminum foil was fixed on a hot plate and heated to 130° C. The liquid compositions A and B had excellent discharge stability, and no discharge failure had occurred. As a result, a positive electrode mixture layer having the active material in the amount per unit area of 2.0 mg/cm$^2$ was prepared, and the liquid compositions A and B had excellent discharge efficiency.

The peel strength of the positive electrode A was 1.05 N, and the capacity per unit area was 0.26 mAh/cm$^2$.

Example 2

A positive electrode A was obtained in a same manner as in the Example 1 except that the liquid compositions A and B were discharged onto an aluminum foil as illustrated in FIG. 3 by using the liquid discharge device EV2500. The liquid compositions A and B had excellent discharge stability, and no discharge failure had occurred. As a result, a positive electrode mixture layer having the active material in the amount per unit area of 1.9 mg/cm$^2$ was prepared, and the liquid compositions A and B had excellent discharge efficiency.

The peel strength of the positive electrode A was 1.09 N, and the capacity per unit area was 0.25 mAh/cm$^2$.

Example 3

A positive electrode A was obtained in a same manner as in the Example 1except that except that the liquid compositions A and B were discharged onto an aluminum foil as illustrated in FIG. 4 by using the liquid discharge device EV2500. The liquid compositions A and B had excellent discharge stability, and no discharge failure had occurred. As a result, a positive electrode mixture layer having the active material in the amount per unit area of 1.9 mg/cm$^2$ was prepared, and the liquid compositions A and B had excellent discharge efficiency.

The positive electrode A had a peel strength of 1.11 N and a capacity per unit area of 0.25 mAh/cm$^2$.

Example 4

A positive electrode A was obtained in a same manner as in the Example 1 except that the liquid compositions A and B were discharged onto an aluminum foil as illustrated in FIG. 5 by using the liquid discharge device EV2500. The liquid compositions A and B had excellent discharge stability, and no discharge failure had occurred. As a result, a positive electrode mixture layer having the active material in the amount per unit area of is 2.1 mg/cm² was prepared, and the liquid compositions A and B had excellent discharge efficiency.

The peel strength of the positive electrode A was 1.08 N, and the capacity per unit area was 0.27 mAh/cm².

Example 5

A positive electrode active material 2 (30% by mass), carbon black (3% by mass), and ethyl lactate (67% by mass) (FUJIFILM WAKO PURE CHEMICAL INDUSTRIES, LTD.) were mixed to prepare a liquid composition C as the first liquid composition. The liquid composition C had a viscosity of 10.3 mPa·s and a modal diameter of 2.52 μm.

Polyamideimide (3% by mass), and N,N-dimethylacetamide (97% by mass) (FUJIFILM WAKO PURE CHEMICAL INDUSTRIES, LTD.) were mixed to prepare a liquid composition D as the second liquid composition. The liquid composition D in which polyamideimide dissolved in N,N-dimethylacetamide had a viscosity of 9.6 mPa·s.

When the liquid composition was prepared by mixing polyamideimide (3% by mass) and ethyl lactate (FUJIFILM WAKO PURE CHEMICAL INDUSTRIES, LTD.) (97%), the liquid composition became cloudy, and a precipitate was formed. That is, polyamideimide, the second electrode material, was more soluble in N,N-dimethylacetamide, the second liquid, than ethyl lactate, the first liquid.

A positive electrode B was obtained by causing the liquid discharge device EV2500 to discharge the liquid compositions C and D onto an aluminum foil as illustrated in FIG. 2. At this time, the aluminum foil was fixed on a hot plate and heated to 120° C. The liquid compositions C and D had excellent discharge stability, and no discharge failure had occurred. As a result, the positive electrode mixture layer having the active material in the amount per unit area of 2.2 mg/cm² was prepared, and the liquid compositions C and D had excellent discharge efficiency.

The positive electrode B had a peel strength of 1.14 N and a capacity per unit area of 0.36 mAh/cm².

Example 6

A positive electrode active material 3 (30% by mass), carbon black (3% by mass), and ethyl lactate (67% by mass) (FUJIFILM WAKO PURE CHEMICAL INDUSTRIES, LTD.) were mixed to prepare the liquid composition E as the first liquid composition. The liquid composition E had a viscosity of 10.7 mPa·s and a modal diameter of 1.22 μm.

A positive electrode C was obtained by causing the liquid discharge device EV2500 to discharge the liquid compositions E and D onto an aluminum foil as illustrated in FIG. 2. At this time, the aluminum foil was fixed on a hot plate and heated to 120° C. The liquid compositions E and D had excellent discharge stability, and no discharge failure had occurred. As a result, the positive electrode mixture layer having the active material in the amount per unit area of 2.0 mg/cm² was prepared, and the liquid compositions E and D had excellent discharge efficiency.

The positive electrode C had a peel strength of 1.05 N and a capacity per unit area of 0.23 mAh/cm².

Example 7

A positive electrode active material 4 (30% by mass), carbon black (3% by mass), and ethyl lactate (67% by mass) (FUJIFILM WAKO PURE CHEMICAL INDUSTRIES, LTD.) were mixed to prepare a liquid composition F as the first liquid composition. The liquid composition F had a viscosity of 11.1 mPa·s and a modal diameter of 1.48 μm.

A positive electrode D was obtained by causing the liquid discharge device EV2500 to discharge the liquid compositions F and D onto an aluminum foil as illustrated in FIG. 2. At this time, the aluminum foil was fixed on a hot plate and heated to 120° C. The liquid compositions F and D had excellent discharge stability, and no discharge failure had occurred. As a result, the positive electrode mixture layer having the active material in the amount per unit area of 2.0 mg/cm² was prepared, and the liquid compositions F and D had excellent discharge efficiency.

The positive electrode D had a peel strength of 1.08 N and a capacity per unit area of 0.25 mAh/cm².

Example 8

A positive electrode active material 5 (30% by mass), carbon black (3% by mass), and ethyl lactate (67% by mass) (FUJIFILM WAKO PURE CHEMICAL INDUSTRIES, LTD.) were mixed to prepare a liquid composition G as the first liquid composition. The liquid composition G had a viscosity of 10.9 mPa·s and a modal diameter of 2.11 μm.

A positive electrode E was obtained by causing the liquid discharge device EV2500 to discharge the liquid compositions G and D onto an aluminum foil as illustrated in FIG. 2. At this time, the aluminum foil was fixed on a hot plate and heated to 120° C. The liquid compositions G and D had excellent discharge stability, and no discharge failure had occurred. As a result, the positive electrode mixture layer having the active material in the amount per unit area of 2.1 mg/cm² was prepared, and the liquid compositions G and D had excellent discharge efficiency.

The positive electrode E had a peel strength of 1.09 N and a capacity per unit area of 0.30 mAh/cm².

Example 9

A negative electrode active material 1 (30% by mass), carbon black (1% by mass), and ethyl lactate (69% by mass) (FUJIFILM WAKO PURE CHEMICAL INDUSTRIES, LTD.) were mixed to prepare a liquid composition H as the first liquid composition. The liquid composition H had a viscosity of 10.1 mPa*s and a modal diameter of 1.05 μm.

A negative electrode A was obtained by causing the liquid discharge device EV2500 to discharge the liquid compositions H and B onto an aluminum foil as illustrated in FIG. 2. At this time, the aluminum foil was fixed on a hot plate and heated to 120° C. The liquid compositions H and B had excellent discharge stability, and no discharge failure had occurred. As a result, the negative electrode mixture layer having the active material in the amount per unit area of 2.1 mg/cm² was prepared, and the liquid compositions H and B had excellent discharge efficiency.

The peel strength of the negative electrode A was 1.05 N, and the capacity per unit area was 0.32 mAh/cm².

Example 10

A negative active material 2 (30% by mass), carbon black (1% by mass), and ethyl lactate (69% by mass) (FUJIFILM WAKO PURE CHEMICAL INDUSTRIES, LTD.) were mixed to prepare a liquid composition I as the first liquid composition. The liquid composition I had a viscosity of 13.1 mPa·s and a modal diameter of 2.15 μm.

A negative electrode B was obtained by causing the liquid discharge device EV2500 to discharge the liquid compositions I and B onto a copper foil, as illustrated in FIG. 2. At this time, the copper foil was fixed on a hot plate and heated to 120° C. The liquid compositions I and B had excellent discharge stability, and no discharge failure had occurred. As a result, a negative electrode mixture layer having the active material in the amount per unit area of 1.9 mg/cm$^2$ was prepared, and the liquid compositions I and B had excellent discharge efficiency.

The peel strength of the negative electrode B was 1.08 N, and the capacity per unit area was 2.0 mAh/cm$^2$.

Example 11

Polyamideimide (6% by mass), and N-methylpyrrolidone (FUJIFILM WAKO PURE CHEMICAL INDUSTRIES, LTD.) (94% by mass) were mixed to prepare a liquid composition B' as a second liquid composition. The liquid composition B' in which polyamideimide dissolved in N-methylpyrrolidone had a viscosity of 9.6 mPa·s.

When polyamideimide (6% by mass) and ethyl lactate (FUJIFILM WAKO PURE CHEMICAL INDUSTRIES, LTD.) (94%) were mixed to prepare a liquid composition, the liquid composition became cloudy, and a precipitate was formed. That is, polyamideimide, a second electrode material, was more soluble in N-methylpyrrolidone, a second liquid, than in ethyl lactate, a first liquid.

A positive electrode A was obtained by causing the liquid discharge device EV2500 to discharge the liquid compositions A and B' onto an aluminum foil as illustrated in FIG. 2. At this time, the aluminum foil was fixed on a hot plate and heated to 130° C. The liquid compositions A and B' had excellent discharge stability, and no discharge failure had occurred. As a result, the positive electrode mixture layer having the active material in the amount per unit area of 2.2 mg/cm$^2$ was prepared, and the liquid compositions A and B' had excellent discharge efficiency.

The peel strength of the positive electrode A was 2.17 N, and the capacity per unit area was 0.26 mAh/cm$^2$.

Example 12

A positive electrode active material 6 (40% by mass), carbon black (3% by mass), and ethyl lactate (57% by mass) (FUJIFILM WAKO PURE CHEMICAL INDUSTRIES, LTD.) were mixed to prepare a liquid composition J as the first liquid composition. The liquid composition J had a viscosity of 11.9 mPa·s and a modal diameter of 9.11 μm.

A positive electrode F was obtained by causing the liquid discharge device EV2500 to discharge liquid compositions J and B onto an aluminum foil as illustrated in FIG. 2. At this time, the aluminum foil was fixed on a hot plate and heated to 120° C. The liquid compositions J and B had excellent discharge stability, and no discharge failure had occurred. As a result, a positive electrode mixture layer having the active material in the amount per unit area of 2.1 mg/cm$^2$ was prepared, and the liquid compositions J and B had excellent discharge efficiency.

The positive electrode F had a peel strength of 1.13 N and a capacity per unit area of 0.34 mAh/cm$^2$.

Example 13

A positive electrode active material 6 (50% by mass), carbon black (3% by mass), and ethyl lactate (FUJIFILM WAKO PURE CHEMICAL INDUSTRIES, LTD.) (47% by mass) were mixed to prepare a liquid composition K as the first liquid composition. The liquid composition K had a viscosity of 13.9 mPa·s and a modal diameter of 9.41 μm.

A positive electrode F was obtained by causing the liquid discharge device EV2500 to discharge the liquid compositions K and B onto an aluminum foil as illustrated in FIG. 2. At this time, the aluminum foil was fixed on a hot plate and heated to 120° C. In the liquid compositions K and B, discharge stability was good, and no discharge failure had occurred. As a result, the positive electrode mixture layer having the active material in the amount per unit area of 2.2 mg/cm$^2$ was prepared, and the liquid compositions K and B had excellent discharge efficiency.

The positive electrode F had a peel strength of 1.09 N and a capacity per unit area of 0.36 mAh/cm$^2$.

Comparative Example 1

A positive electrode active material (30% by mass), carbon black (3% by mass), polyamideimide (3% by mass), and ethyl lactate (64% by mass) (FUJIFILM WAKO PURE CHEMICAL INDUSTRIES, LTD.) were mixed to prepare a liquid composition L. However, the liquid composition L failed to be discharged because the liquid composition L had gelled.

Comparative Example 2

A negative electrode active material 2 (30% by mass), carbon black (10% by mass), polyamideimide (3% by mass), and N-methylpyrrolidone (57% by mass) were mixed to prepare a liquid composition M. However, the liquid composition M had increased viscosity. The liquid composition M had a modal diameter of 11.5 μm and failed to be discharged.

Comparative Example 3

A positive electrode active material 1 (30% by mass), carbon black (3% by mass), polyimide imide (3% by mass), and N-methylpyrrolidone (64% by mass) were mixed to prepare a liquid composition N. The liquid composition N had a viscosity of 13.5 mPa·s and a modal diameter of 1.71 μm.

A positive electrode A was obtained by causing the liquid discharge device EV2500 to discharge the liquid composition N onto an aluminum foil as illustrated in FIG. 2. At this time, the aluminum foil was fixed on a hot plate and heated to 120° C. The liquid composition N had excellent discharge stability, and no discharge failure had occurred. As a result, a positive electrode mixture layer having the active material in the amount per unit area of 1.9 mg/cm$^2$ was prepared, and the liquid composition N had excellent discharge efficiency.

The peel strength of the positive electrode A was 1.01 N, and a capacity per unit area was 0.24 mAh/cm$^2$.

Comparative Example 4

A positive electrode active material 1 (30% by mass), carbon black (3% by mass), and N-methylpyrrolidone (67% by mass) were mixed to prepare a liquid composition N'. The liquid composition N' had a viscosity of 10.2 mPa·s and a modal diameter of 1.71 μm.

A positive electrode A' was obtained by causing the liquid discharge device EV2500 to discharge the liquid composition N' onto an aluminum foil as illustrated in FIG. 2. At this time, the aluminum foil was fixed on a hot plate and heated to 120° C. The liquid composition N' had excellent discharge stability, and no discharge failure had occurred. As a result, a positive electrode mixture layer having the active material in the amount per unit area of 1.9 mg/cm$^2$ was prepared, and the liquid composition N' had excellent discharge efficiency.

The peel strength of the positive electrode A' was 0.002N, and its capacity per unit area was thus failed to be measured.

Table 2 illustrates evaluation results of the amount of the active material per unit area, the peel strength of the electrode mixture layer, and the capacity of the electrode.

The liquid abbreviations are as follows.
NMP: N-methylpyrrolidone
DMA: N,N-dimethylacetamide The electrode of Comparative Example 2 had increased viscosity because the negative electrode B was prepared by using a single liquid composition M containing NMP that was used in liquid composition B of Example 10.

The electrode of Comparative Example 3 had the excellent amount of the active material of the electrode per unit area, the excellent peel strength of the electrode mixture layer, and the excellent capacity of the electrode but the design flexibility of the liquid composition N was low.

The electrode of Comparative Example 4 had low peel strength of the electrode mixture layer because the liquid composition N' includes no binder.

TABLE 2

| | FIRST LIQUID COMPOSITION | | SECOND LIQUID COMPOSITION | | ELECTRODE | | | ELECTRODE MIXTURE LAYER | |
| | | | | | | MANUFAC- | | AMOUNT OF ACTIVE | PEELING STRENGTH OF ELECTRODE |
| | | | | | | TURING | CAPACITY | MATERIAL | MIXTURE |
| | TYPE | LIQUID | TYPE | LIQUID | TYPE | METHOD | [mAh/cm$^2$] | [mg/cm$^2$] | LAYER [N] |
|---|---|---|---|---|---|---|---|---|---|
| EXAMPLE 1 | A | ETHYL LACTATE | B | NMP | POSITIVE ELECTRODE A | FIG. 2 | 0.26 | 2.0 | 1.05 |
| EXAMPLE 2 | A | ETHYL LACTATE | B | NMP | POSITIVE ELECTRODE A | FIG. 3 | 0.25 | 1.9 | 1.09 |
| EXAMPLE 3 | A | ETHYL LACTATE | B | NMP | POSITIVE ELECTRODE A | FIG. 4 | 0.25 | 1.9 | 1.11 |
| EXAMPLE 4 | A | ETHYL LACTATE | B | NMP | POSITIVE ELECTRODE A | FIG. 5 | 0.27 | 2.1 | 1.08 |
| EXAMPLE 5 | C | ETHYL LACTATE | D | DMA | POSITIVE ELECTRODE B | FIG. 2 | 0.36 | 2.2 | 1.14 |
| EXAMPLE 6 | E | ETHYL LACTATE | D | DMA | POSITIVE ELECTRODE C | FIG. 2 | 0.23 | 2.0 | 1.05 |
| EXAMPLE 7 | F | ETHYL LACTATE | D | DMA | POSITIVE ELECTRODE D | FIG. 2 | 0.25 | 2.0 | 1.08 |
| EXAMPLE 8 | G | ETHYL LACTATE | D | DMA | POSITIVE ELECTRODE E | FIG. 2 | 0.30 | 2.1 | 1.09 |
| EXAMPLE 9 | H | ETHYL LACTATE | B | NMP | NEGATIVE ELECTRODE A | FIG. 2 | 0.32 | 2.1 | 1.05 |
| EXAMPLE 10 | I | ETHYL LACTATE | B | NMP | NEGATIVE ELECTRODE B | FIG. 2 | 2.0 | 1.9 | 1.08 |
| EXAMPLE 11 | A | ETHYL LACTATE | B' | NMP | POSITIVE ELECTRODE A | FIG. 2 | 0.26 | 2.2 | 2.17 |
| EXAMPLE 12 | J | ETHYL LACTATE | B | NMP | POSITIVE ELECTRODE F | FIG. 2 | 0.34 | 2.1 | 1.13 |
| EXAMPLE 13 | K | ETHYL LACTATE | B | NMP | POSITIVE ELECTRODE F | FIG. 2 | 0.36 | 2.2 | 1.09 |
| COMPARATIVE EXAMPLE 1 | L | ETHYL LACTATE | — | — | POSITIVE ELECTRODE A | — | — | — | — |
| COMPARATIVE EXAMPLE 2 | M | NMP | — | — | NEGATIVE ELECTRODE B | — | — | — | — |
| COMPARATIVE EXAMPLE 3 | N | NMP | — | — | POSITIVE ELECTRODE A | FIG. 2 | 0.24 | 1.9 | 1.01 |
| COMPARATIVE EXAMPLE 4 | N' | NMP | — | — | POSITIVE ELECTRODE A' | FIG. 2 | — | 1.9 | 0.002 |

Table 2 indicates that the electrodes of Examples 1 to 13 had the excellent amount per unit area of the active material, excellent peel strength of the electrode mixture layer, excellent electrode capacity, and high design flexibility. For example, the electrode of Example 11 had high peel strength of the electrode mixture layer because the amount of binder added was increased.

In contrast, the electrode of Comparative Example 1 had gelled because the positive electrode A was prepared by using a single liquid composition L containing ethyl lactate that was used in the liquid composition A of Examples 1 to 4 and 11.

Advantageous Effect of the Invention

According to the present disclosure, a set of liquid compositions is provided. The set of liquid compositions exhibits high design flexibility and is capable of being used to form a positive or negative electrode mixture layer constituting an electrochemical element.

What is claimed is:
1. A set of liquid compositions used to form a positive or negative electrode layer, the set of liquid compositions comprising:
a first liquid composition having a first electrode material dissolving or dispersing in a first liquid; and a second liquid composition having a second electrode material dissolving or dispersing in a second liquid, the second electrode material differing from the first electrode material, and the second liquid differing from the first liquid, wherein the second electrode material is more soluble in the second liquid than in the first liquid, wherein either (i) the first and second electrode materials are positive electrode materials or (ii) the first and second electrode materials are negative electrode materials, and wherein the first liquid composition comprises ethyl lactate or the second liquid composition comprises N-methyl pyrrolidone or N,N-dimethylacetamide.

2. The set of liquid compositions according to claim 1, wherein at least one of the first liquid composition and the second liquid composition includes two or more liquid types.

3. The set of liquid compositions according to claim 1, wherein each of the first liquid composition and the second liquid composition has a viscosity at 25° C. of 200 mPA·s or less.

4. The set of liquid compositions according to claim 1, wherein the first electrode material includes a conductive assistant.

5. The set of liquid compositions according to claim 1, wherein at least one electrode material selected from the group consisting of the first electrode material and the second electrode material includes an active material, and the active material is a material capable of occluding or releasing alkali metal ions.

6. The set of liquid compositions according to claim 1, wherein at least one electrode material selected from the group consisting of the first electrode material and the second electrode material includes an active material, and a liquid composition selected from the group consisting of the first and the second liquid composition including the active material has a content of the active material of 20% by mass or more.

7. The set of liquid compositions according to claim 1, wherein each of the first electrode material and the second electrode material has modal diameter of 20 µm or less.

8. The set of liquid compositions according to claim 1, wherein each of the first electrode material and the second electrode material has a modal diameter of 3 µm or less.

9. A method for manufacturing an electrochemical element, the method comprising: applying the set of liquid compositions according to claim 1 onto an electrode substrate to form an electrode mixture layer.

10. The set of liquid compositions according to claim 1, wherein at least one electrode material selected from the group consisting of the first electrode material and the second electrode material includes an active material, and a liquid composition selected from the group consisting of the first and the second liquid composition including the active material has a content of the active material of 25% by mass or more but 60% by mass or less.

11. The set of liquid compositions according to claim 1, wherein the first liquid comprises ethyl lactate and the second liquid comprises N-methylpyrrolidone.

12. The set of liquid compositions according to claim 1, wherein the first liquid comprises ethyl lactate and the second liquid comprises N,N-dimethylacetamide.

13. A set of liquid compositions used to form a positive or negative electrode layer,
the set of liquid compositions comprising:
a first liquid composition having a first electrode material dissolving or dispersing in a first liquid; and
a second liquid composition having a second electrode material dissolving or dispersing in a second liquid,
the second electrode material differing from the first electrode material, and the second liquid differing from the first liquid,
wherein the second electrode material is more soluble in the second liquid than in the first liquid, and
wherein the first liquid comprises ethyl lactate.

14. The set of liquid compositions according to claim 13, wherein the second liquid composition comprises N-methylpyrrolidone.

15. The set of liquid compositions according to claim 13, wherein the second liquid composition comprises N,N-dimethylacetamide.

16. The set of liquid compositions according to claim 1, wherein the first and second electrode materials are positive electrode materials.

17. The set of liquid compositions according to claim 1, wherein the first and second electrode materials are negative electrode materials.

18. A method for manufacturing an electrode, wherein in the method the electrode is provided with an electrode mixture layer that includes a first electrode material and a second electrode material, the method comprising:
applying substantially simultaneously or simultaneously a set of liquid compositions onto the same electrode substrate to form the electrode mixture layer,
wherein the set of liquid compositions comprises a first liquid composition containing the first electrode material dissolving or dispersing in a first liquid; and a second liquid composition containing the second electrode material dissolving or dispersing in a second liquid, the second electrode material differing from the first electrode material, and the second liquid differing from the first liquid, wherein the second electrode material is more soluble in the second liquid than in the first liquid,
wherein the electrode is thereby provided with the electrode mixture layer that includes the first electrode material and the second electrode material, and
wherein the first liquid composition is applied onto the electrode substrate using a first application unit and the second liquid composition is applied onto the electrode substrate using a second application unit.

19. The method for manufacturing according to claim 18, the method comprising applying simultaneously the set of liquid compositions onto the electrode substrate to form the electrode mixture layer.

20. The method for manufacturing according to claim 9, comprising applying the set of liquid compositions onto a positive electrode substrate to form a positive electrode mixture layer wherein (i) the first and second electrode materials are positive electrode materials.

21. The method for manufacturing according to claim 9, comprising applying the set of liquid compositions onto a negative electrode substrate to form a negative electrode mixture layer wherein (ii) the first and second electrode materials are negative electrode materials.

22. The method for manufacturing according to claim 18, comprising discharging droplets of the first liquid composition and the second liquid composition and combining the first and second liquid droplets together to form the electrode mixture layer.

23. The method for manufacturing according to claim 18, wherein either (i) the first and second electrode materials are positive electrode materials or (ii) the first and second electrode materials are negative electrode materials.

* * * * *